(12) United States Patent
Mizukami et al.

(10) Patent No.: US 7,488,701 B2
(45) Date of Patent: *Feb. 10, 2009

(54) OPTICAL INFORMATION RECORDING MEDIUM, MANUFACTURING METHOD THEREOF AND IMAGE PROCESSING METHOD

(75) Inventors: Satoshi Mizukami, Atsugi (JP); Yoshihiko Hotta, Mishima (JP); Fumiya Ohmi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 11/091,799

(22) Filed: Mar. 28, 2005

(65) Prior Publication Data

US 2006/0120265 A1    Jun. 8, 2006

(30) Foreign Application Priority Data

Mar. 29, 2004 (JP) .............................. 2004-096987
May 21, 2004 (JP) .............................. 2004-152552

(51) Int. Cl.
*B41M 5/41* (2006.01)
*B32B 3/00* (2006.01)
(52) U.S. Cl. ..................... 503/201; 427/152; 428/64.4
(58) Field of Classification Search ................. None
See application file for complete search history.

(56) References Cited

U.S. PATENT DOCUMENTS 4,670,323 A    6/1987  Nakamura et al.
4,690,861 A    9/1987  Nakamura et al.
5,974,025 A    10/1999 Yamada et al.
6,174,836 B1   1/2001  Hotta et al.

(Continued)

FOREIGN PATENT DOCUMENTS

EP            0891875 A2    1/1999

(Continued)

OTHER PUBLICATIONS

Aug. 29, 2005 official Communication and European Search Report in connection with European Application No. EP 05 00 6805 which corresponds to the above-identified application.

*Primary Examiner*—Bruce H Hess
(74) *Attorney, Agent, or Firm*—Cooper & Dunham LLP

(57) ABSTRACT

An object of the present invention is to provide an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium; a manufacturing method of the above-noted optical information recording medium; and an image processing method using the above-noted optical information recording medium. For this object, the present invention provides the optical information recording medium comprising a substrate, an optical information layer disposed on the substrate and a reversible thermosensitive layer in which at least a part of the information recorded in the optical information layer can be recorded in such a manner that the part of the information can be visually recognized, in this order; and further a cushion layer in at least a part of the space between the optical information layer and the reversible thermosensitive layer.

36 Claims, 10 Drawing Sheets

U.S. PATENT DOCUMENTS

| | | |
|---|---|---|
| 6,329,035 B1 * | 12/2001 | Iwasaki et al. ............. 428/64.1 |
| 6,373,802 B1 | 4/2002 | Hattori et al. |
| 6,445,669 B1 | 9/2002 | Hattori et al. |
| 6,489,265 B1 | 12/2002 | Hotta et al. |
| 6,580,672 B2 | 6/2003 | Hattori et al. |
| 6,760,291 B2 | 7/2004 | Hattori et al. |
| 6,775,213 B2 | 8/2004 | Hattori et al. |
| 6,818,591 B2 * | 11/2004 | Arai et al. ................... 503/201 |
| 2002/0142236 A1 | 10/2002 | Iwasaki et al. |
| 2002/0172123 A1 | 11/2002 | Ohmi |
| 2005/0137088 A1 | 6/2005 | Hayakawa et al. |

FOREIGN PATENT DOCUMENTS

| | | |
|---|---|---|
| EP | 1543985 A2 | 6/2005 |
| JP | 5-238005 | 9/1993 |
| JP | 8-48080 | 2/1996 |
| JP | 8-180642 | 7/1996 |
| JP | 2000-105947 | 4/2000 |
| JP | 2000-155989 | 6/2000 |
| JP | 2003-276337 | 9/2003 |

* cited by examiner

OPTICAL INFORMATION RECORDING MEDIUM, MANUFACTURING METHOD THEREOF AND IMAGE PROCESSING METHOD

BACKGROUND OF THE INVENTION

1. Field of the Invention

The present invention relates to an optical information recording medium having a reversible display function, manufacturing method thereof and an image processing method using the optical information recording medium.

2. Description of the Related Art

Beisdes a read-only optical information recording medium, such as a DVD (Digital Versatile Disk), a recordable DVD (e.g., DVD+RW, DVD+R, DVD-R, DVD-RW and DVD-RAM) is put to practical use. These recordable DVD media, such as DVD+R and DVD+RW media are developed on an extended line of developing the technique for a conventional recordable compact disk, such as a compact disk recordable (CD-R) and a compact disk rewritable (CD-RW) and for maintaining the compatibility of the above-noted recordable DVD media with a read-only DVD, the recordable DVD media are designed in such a manner that the recording density (the track pitch and signal mark length) and substrate thickness of the recordable DVD media satisfy not only the requirements for CD but also the requirements for DVD.

For example, a DVD+R is produced, like a CD-R in such a manner that a substrate for the information recording in which an optical recording layer is disposed on a substrate by a spinning coating and on the optical recording layer, a metal reflective layer is disposed, is laminated through a laminating material with a substrate having the same form as that of the above-noted substrate for the information recording. In this case, for producing the optical recording layer, a dye material is used.

One of features of the CD-R is having a high reflectance (65%) which satisfies the requirements for CD. For obtaining a high reflectance by the above-noted composition of CD-R (or DVD+R), it is necessary that the light absorbing layer satisfies a specific complex reflectance at a wavelength of a recording/reproducing light.

A compact disk-read only memory (CD-ROM) or a digital versatile disk-read only memory (DVD-ROM) already has data recorded in them, at the time they have been produced and is used as a read-only optical information recording medium. In them, an index showing the recorded content or various designs is printed on the surface of the protective layer using an ultraviolet-curing ink or an oil ink. Such a printing is usually performed by a printing means, such as a screen printing or an offset printing. These printing means are suitable for a so-called mass printing in which the same pattern is printed in a large amount simultaneously.

When in a write-once optical information recording medium, such as a DVD+R, DVD-R and CD-R, an elecrtronic information or the like is recorded, the recorded data cannot be recognized unless the optical information recording medium is reproduced. Therefore, as a recording method of the above-noted index and various designs, the following methods are proposed. (1) a method for writing the index or designs on the protective layer using an oil felt pen, (2) a method for applying a thin label thereon for forming the indication, (3) a method for recording the indication according to an inkjet recording process by disposing an ink-receiving layer on the surface of the optical information recording medium (see Japanese Patent Application Laid-Open (JP-A) No. 05-238005) and (4) a method for recording the indication according to a sublimation dye transfer recording method by disposing a dye-receiving layer on the surface of the optical information recording medium ( see JP-A No. 08-48080)

On the other hand, a rewritable optical information recording medium, such as a DVD+RW, DVD-RW, DVD-RAM and CD-RW is disadvantageous in that in the case where the index or the like is recorded for the indication according to the above-noted felt pen recording method, inkjet recording method or sublimation dye transfer recording method, even if a recorded content is changed, the indication cannot be changed and an actual recorded content differs from the indication, so that the recorded content cannot be known by reading the indication. In this case, when by using a thin label used for the CD-R, the thin label is replaced with a new one repeatedly depending on the change of the recorded content for changing the indication, the optical information recording medium might be scratched.

After the optical information recording medium is inserted into a reproducing apparatus, the recording medium is clamped and while the recording medium is rotated, to the recorded-data read-out side of the recording medium, a laser light is irradiated through a pickup, thereby reproducing the recorded data. For performing the insert of the optical information recording medium into the reproducing apparatus or the reproduction of the recorded data stably and reliably, the specifications for the thickness, the warpage and the dynamic in balance of the optical information recording medium are prescribed. When a printing medium is adhesive-bonded to the printing indicating surface of the label surface of the optical information recording medium without consideration of the above-noted propertries of the optical information recording medium, the mass balance (the so-called dynamic in balance) of the produced optical information recording medium is impaired. When the dynamic in balance is impaired, the optical medium is rotated irregularly and the reproducing and recording of the information may have a defect. Recently, for enhancing the transfer rate of the data, a large rotation number is required and it is necessary that the dynamic in balance is more improved, so that in the printing of the title, the optical information recording medium has preferably a thickness which is near to the above-noted specification.

In the case where the title or the like is printed on the printing indicating surface of the optical information recording medium using a printing apparatus, when the heat applied by the thermal head to the data recording layer, is transmitted excessively to the data recording layer, the recorded data become destroyed. Due to the variety of the warpage and thickness which the optical information recording medium usually have, the adhesion properties of the printing medium with the thermal head are impaired and when the heat from the thermal head is not uniformly tranmitted to the color-developing layer of the recording medium, the printing quality is lowered. Therefore, JP-A No. 08-180642 proposes the strengthening of the adhesion properties of the printing medium with the thermal head by disposing a flexible resin layer as an under layer of a layer in which the ink for the thermofusible transfer printer can be fixed. JP-A No. 2000-155989 proposes a technique of preventing the heat transmitting to an optical recording member by disposing a thermal insulating layer between the optical recording member and a thermosensitive color developing layer. However, in the above-noted two disposals, when the flexible resin layer or the thermal insulating layer is individually disposed, a disadvantage is caused respectively wherein the transmission of the heat to the optical recording member can be difficultly prevented or wherein the adhesion properties of the printing medium with the thermal head cannot be satisfactorily improved.

In the case where a printing medium is adhesive-bonded on the printing indicating surface of the label surface of the optical information recording medium, depending on the wrapage degree of the optical information recording medium, the adhesion properties of the printing medium with the thermal head are impaired and with respect to the indication of the printing medium, a defect is caused. The adhesion between the printing medium and the thermal head varies depending on the size of the thermal head as follows.

When an optical information recording medium having a warpage angle of within ±0.7° is contacted with a printing indicating medium using a thermal head having a size of 35 mm, the maximum distance between the optical information recording medium and the thermal head is so large as 30 μm to 60 μm, so that the adhesion between the printing medium and the thermal head is impaired and a disadvantage is caused wherein the image display of the printing medium becomes ununiformly.

Accordingly, an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium, has not yet been provided and a prompt development thereof has been desired nowadays.

SUMMARY OF THE INVENTION

Accordingly, an object of the present invention is to provide an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium; a manufacturing method of the above-noted optical information recording medium; and an image processing method using the above-noted optical information recording medium.

The optical information recording medium according to the present invention comprises a substrate, an optical information layer, a cushion layer, and a reversible thermosensitive layer, in this order, wherein the cushion layer is disposed in at least a part of a space between the optical information layer and the reversible thermosensitive layer in such a manner that the cushion layer has a thickness of 20 μm to 100 μm and in the reversible thermosensitive layer, at least a part of the information recorded in the optical information layer can be recorded in such a manner that the part of the information can be visually recognized.

In this case, such aspects are preferred as an aspect in which in at least one of the inner circle part, the middle circle part and the outer circle part of the optical information recording medium between the optical information layer and the reversible thermosensitive layer, the optical information recording medium comprises a cushion layer and an adhesive layer, an aspect in which the optical information recording medium comprises a cavity instead of the cushion layer and the adhesive layer between the optical information layer and the reversible thermosensitive layer, an aspect in which the optical information recording medium comprises a gap part in which the cushion layer and the adhesive layer are not disposed, in at least one of the inner circle part, the middle circle part and the outer circle part of the optical information recording medium, an aspect in which the cavity and the gap part are communicative connected and the gap part is opened to the outer side of the optical information recording medium, an aspect in which the optical information recording medium comprises a cushion layer having a thickness of A (μm) between the optical information layer and the reversible thermosensitive layer and the deformation degree B (μm) of the cushion layer in the vertical direction caused by at least one of the image forming and the image erasing performed using an image processing unit in the optical information recording medium satifies the numerical formula: $0.3 \leq B/A \leq 0.8$, an aspect in which the deformation degree B (μm) of the cushion layer in the vertical direction caused by at least one of the image forming and the image erasing performed using an image processing unit in the optical information recording medium and the restoration degree C (μm) of the cushion layer in the vertical direction caused by the removing of the image processing unit from the optical information recording medium after at least one of the image forming and the image erasing was performed, satisfy the numerical formula: $0.5 \leq C/B \leq 1$, an aspect in which the thickness D (μm) of the reversible thermosensitive layer and the thickness A (μm) of the cushion layer satisfy the numerical formula: $60 \, \mu m \leq A + D \leq 200 \, \mu m$, an aspect in which the reversible thermosensitive layer has a thickness distribution having a form corresponding to the form of the warpage of the optical information layer from the inner circle part of the optical information recording medium to the outer circle part of the optical information recording medium, an aspect in which when the optical information layer has an upward warpage, the reversible thermosensitive layer has a thickness distribution having a concave form from the inner circle part of the optical information recording medium to the outer circle part of the optical information recording medium and an aspect in which when the optical information layer has an downward warpage, the reversible thermosensitive layer has a thickness distribution having a convex form from the inner circle part of the optical information recording medium to the outer circle part of the optical information recording medium.

By employing the above-noted aspects, in the optical information recording medium according to the present invention, to the inner circle part, middle circle part and outer circle part of the optical information recording medium, the heat can be uniformly transmitted using an image processing unit (, such as the thermal head), so that an uniform image can be formed and for preventing the accumulation of the heat applied by the image processing unit (, such as the thermal head) in the optical information recording medium, the heat can escape out of the optical information recording medium, so that the destruction of the recorded data can be prevented.

The manufacturing method of the optical information recording medium according to the present invention is, in the first form, a manufacturing method of the optical information recording medium according to the present invention comprising:

disposing the cushion layer at least in a part between the optical information layer and the reversible thermosensitive layer and laminating the optical information layer and the reversible thermosensitive layer in such a manner that the optical information recording medium has a weight imbalance of 2.5 g·mm or less.

The manufacturing method of the optical information recording medium according to the present invention is, in the second form, a manufacturing method for producing the optical information recording medium according to the present invention comprising:

disposing the reversible thermosensitive layer having a thickness distribution of which form corresponds to the form of the light information layer having a warpage angle of within ±0.7° and a warpage degree of 0.3 mm or less, wherin the revesible thermosensitive layer has the above-noted thickness distribution from the inner circle part of the optical information recording medium to the outer circle part of the optical information recording medium, and laminating the optical information layer and the reversible thermosensitive layer.

According to the manufacturing method of the above-noted first form and second form, an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium, can be effectively produced.

The image processing method according to the present invention comprises at least one of forming the image in the reversible thermosensitive layer of the optical information recording medium according to the present invention by heating the reversible thermosensitive layer, and erasing the image in the reversible thermosensitive layer of the optical information recording medium according to the present invention by heating the reversible thermosensitive layer. According to the image processing method of the present invention, using an optical information recording medium by which the getting thereof in and out of a reproducing apparatus and the reproducing of recording data can be stably and reliably performed and the recording content can be visually confirmed, an uniform image can be effectiveky formed easily, with a good appearance and without damaging the optical information recording medium.

DESCRIPTION OF THE PREFERRED EMBODIMENTS (Optical Information Recording Medium)

The optical information recording medium according to the present invention comprises a substrate, an optical information layer disposed on the sustrate and a reversible thermosensitive layer in this order and optionally further other layers.

The optical information recording medium according to the present invention comprises a cushion layer in at least a part of the space between the optical information layer and the reversible thermosensitive layer, an adhesive layer and optionally other layers.

When, in the reversible thermosensitive layer of the optical information recording medium, the forming and erasing of the image are performed using the same heating unit, such as a thermal head or a laser, is used. When as a heating unit the thermal head is used, due to the variety of the warpage or the thickness which the optical information recording medium has usually, the adhesion between the thermal head and the reversible thermosensitive layer is impaired, so that the printing quality is lowered. Further, a disadvantage is caused wherein the heat applied by the thermal head is transmitted to the optical information layer, so that the properties of the optical information recording medium are impaired.

Therefore, according to the present invention, a cushion layer and an adhesive layer comprising at least one of a cushioning material and a flexible material which can absorb a vertical outer stress generated in an under layer of the reversible thermosensitive layer, are disposed in at least a part of the inner circle part, middele circle part and outer circle part of the optical information recording medium.

In this case, it is preferred that the optical information recording medium comprises a cavity in which the cushion layer and adhesive layer are not disposed, between the optical information layer and the revesible thermosensitive layer, and comprises a gap part in which the cushion layer and adhesive layer are not disposed, in at least one of the inner circle part, middele circle part and outer circle part of the optical information recording medium. It is also preferred that the cavity and the gap part are communicative connected and are opened to the outer side of the recording medium, so that for preventing the accumulation of the heat applied by the thermal head in the disc, the heat can be caused to escape out of the disc and the destruction of the recording data can be prevented.

Figure 9:
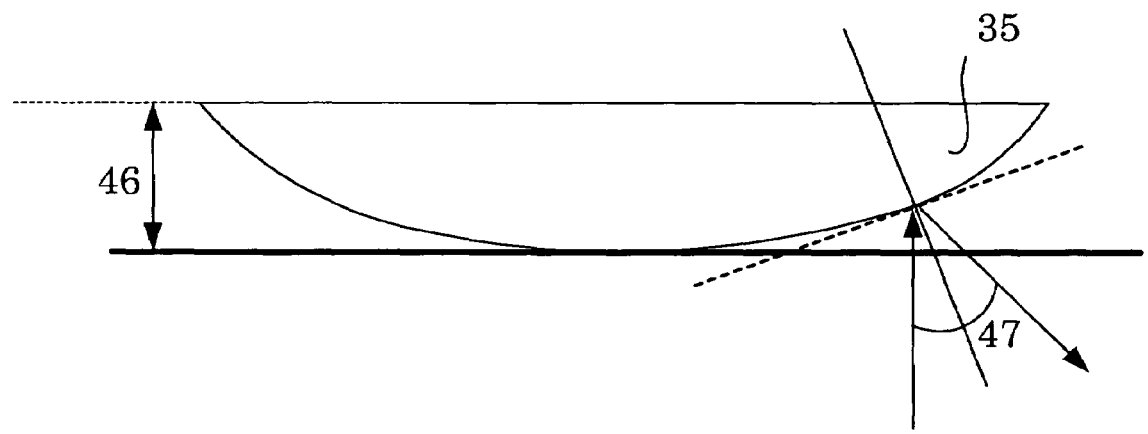
FIG. 9 is an explanatory section view explaining the definition of the warpage angle and warpage degree in the optical information recording medium.

According to the present invention, when in the reversible thermosensitive layer of the optical information recording medium having the reversible display function, the forming and erasing of the image are performed using the same image processing unit (heating unit), as a imge processing unit, for example a thermal head or a laser is used. When as the image processing unit (heating unit), the thermal head is used, due to the variety of the warpage or thickness which the optical information recording medium usually has, the adhesion between the thermal head and reversible thersensitive layer is impaired, so that a disadvantage is caused wherein the printing quality is lowered. According to the physical format standard of the DVD-Video/ROM with respect to the mechanical properties, such as the warpage angle and warpage degree, the warpage angle should be within ±0.7° and the warpage degree should be 300 μm or less. According to the physical format standard of CD-ROM, the warpage angle should be within ±0.6° and the warpage degree should be 400 μm or less As shown in FIG. 9, the warpage angle 47 is defined as the maximum angle among the angles formed between the standard surface which is a disc surface of a clamped completely plane optical information recording medium and all of the tangent lines which are drawn with respect to all of the surfaces of the optical information recording medium 35 which are to be measured. The warpage degree 46 is defined as a distance between the above-noted standard surface and a point in the optical information recording medium 35 which is distant from the standard surface by the maximum distance G among all points in the optical information recording medium 35. When the warpage angle 47 and the warpage degree 46 are more than the above-noted range of the standard, the light irradiated into the optical information recording medium and reflected by the optical information recording medium cannot return to the pickup, so that a disadvantage is caused wherein the recorded information cannot be read out. Further, by a large warpage angle 47 and a large warpage degree 46, the maximum distance G during the contact of the thermal head with the optical information recording medium is largely affected adversely, so that the printing quality is directly affected adversely.

Figure 10:
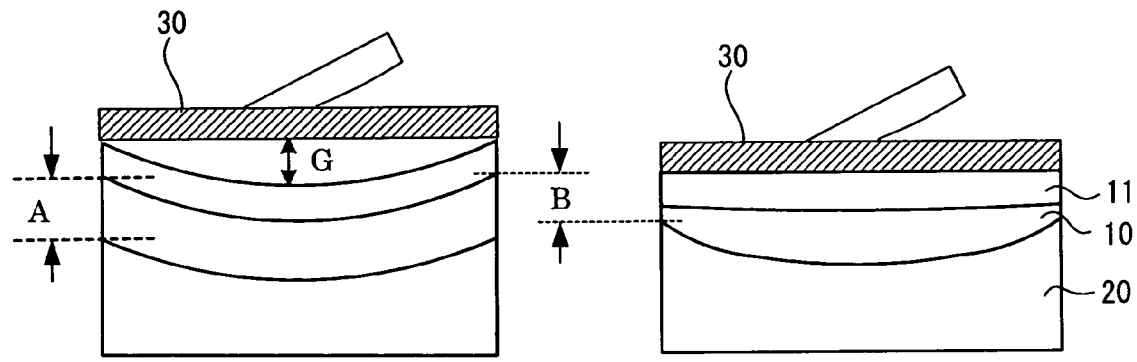
FIG. 10 is a section view schematically showing the deformation degree of the cushion layer in the vertical direction, which is caused by applying the pressure vertically to the surface of the optical information recording medium.

As shown in FIG. 10 (the left figure shows the state during the contact of the recording medium with the thermal head 30 and the right figure shows the state during the printing and erasing in the recording medium), in the case where at least one of the image forming and image erasing is performed (i.e., a pressure is applied in the vertical direction to the optical information recording medium using the thermal head 30) in the optical information recording medium using an image processing unit, wherein the optical information recording medium comprises a cushion layer 10 having a thickness of A (μm) between an optical information layer 20 and a reversible thermosensitive layer 11, when the deformation degree of the cushion layer 10 in the vertical direction is B (μm), a cushion layer 10 in which the above-noted B (μm) satisfies preferably the numerical formula: $0.3 \leq B/A \leq 0.8$, more preferably the numerical formula: $0.5 \leq B/A \leq 0.8$, is disposed.

The printing and erasing is actually performed in thre reversible thermosensitive layer of the optical information recording medium using the thermal head, for example under 1.8 N for 2 to 3 seconds.

The cushion layer has a thickness A (μm) of 20 μm to 100 μm, preferably 40 μm to 100 μm, more preferably 50 μm to 80 μm. The deformation degree B (μm) in the vertical direction of the cushion layer is preferably 5 μm to 60 μm, more preferably 10 μm to 40 μm. According to these properties of the cushion layer, even when a gap between the optical information recording medium and the thermal head is caused and the optical information recording medium and the thermal head are not completely contacted with each other, by using the above-noted cushion layer, the printing quality can be maintained. Further, during the repeating of the printing and erasing by using the thermal heater and ceramic heater, when the cushion layer has not a satisfactory restoring force, the cushion layer cannot recover the original thickness and the thickness of the cushion layer is lessened, so that it is feared that the cushion layer cannot obtain the effect as the cushion layer.

Figure 11:
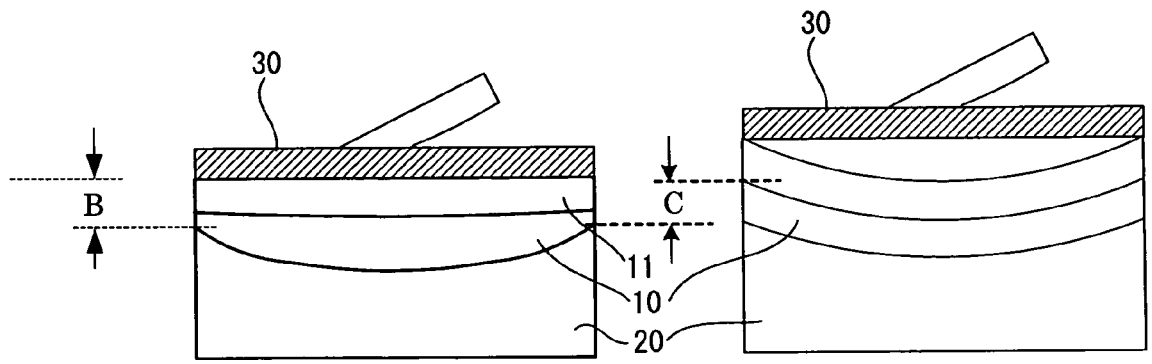
FIG. 11 is a section view schematically showing the restoration degree of the cushion layer in the vertical direction, which is caused by removing the pressure which has been vertically applied to the surface of the optical information recording medium.

For avoiding this fear, as shown in FIG. 11 (the left figure shows the state during the printing and erasing in the recording medium and the right figure shows the state after the printing and erasing in the recording medium), the cushion layer is disposed in such a manner that the deformation degree B (μm) in the vertical direction of the cushion layer and the restoration degree C (μm) in the vertical direction of the cushion layer, wherein the restoration degree C (μm) is measured when the thermal head is removed from the optical information recording medium after at least one of the forming and erasing of the image has been performed in the optical information recording medium using the thermal head (i.e., when the printing is completed, more specifically, when the pressure applied by the thermal head 30 in the vertical direction to the reversible thermosensitive layer of the optical information recording medium, is removed), satisfy the numerical formula: $0.5 \leq C/B \leq 1$. Accoding to the thus obtained cushion layer, even after the repeating of the printing and erasing, the cushion layer can maintain the effect as the cushion layer, so that the optical information recording medium can maintain the printing quality. Futher, the cushion layer satisfy more preferably the numerical formula: $0.85 \leq C/B \leq 1$.

The restoration degree C (μm) of the cushion layer is not restricted and may be properly selected depending on the application. The restoration degree C (μm) is preferably 8.5 μm to 40 μm.

The cushion layer comprises at least one of a cushioning material and an elastic material and optionally other materials. The cushioning material and the elastic material are not restricted and may be properly selected depending on the application. Examples of the cushioning material or the elastic material include a polyvinyl chloride resin, a flexible polyethylene resin, a polyvinyl acetate resin and a nitrile-butadiene rubber.

The material for the adhesive layer is not restricted and may be properly selected depending on the application. Examples of the material for the adhesive layer include an urea resin, a melamine resin, a phenol resin, an epoxy resin, a vinyl acetate resin, a vinyl acetate-acrylate copolymer, an ethylene-vinyl acetate copolymer, an acrylic resin, a polyvinyl ether resin, a vinyl chloride-vinyl acetate copolymer, a polystyrene resin, a polyester resin, a polyurethane resin, a polyamide resin, a chlorinated polyolefin resin, a polyvinyl butyral resin, an acrylic ester copolymer, a methacrylic ester copolymer, a natural rubber, a cyanoacrylate resin and a silicone resin.

The combined thickness of the cushion layer and the adhesive layer is not restricted and may be selected depending on the application. The combined thickness is preferably 50 μm to 100 μm.

Figure 4:
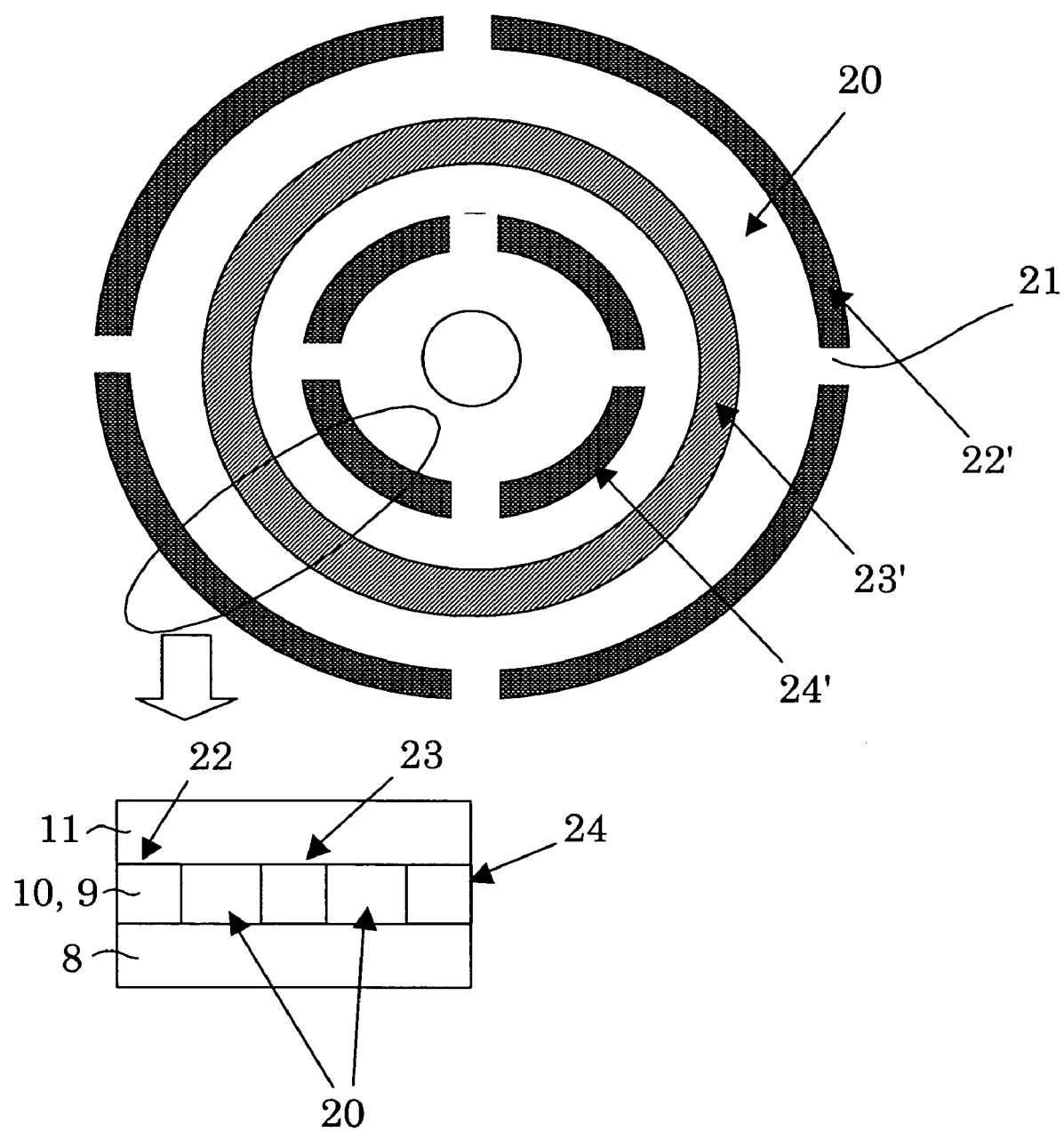
FIG. 4 is a plan view schematically showing the locations of the adhesive layer and cushion layer of the optical information recording medium according to the present invention, which is observed vertically from a point over the recording medium.

As shown in FIG. 4, by disposing the cavity 20 in the cushion layer 10 and an adhesive layer 9 between the reversible thermosensitive layer 11 and the optical information layer of the cover substrate 8 and by disposing the gap part 21 which is communicative conneted with the cavity 20, the heat applied by the thermal head is not accumulated in the disc and can be caused to escape out of the disc. In FIG. 4, four gap parts 21 where the cushion layer 10 and adhesive layer 9 are not disposed are disposed only in the inner circle part 24 and outer cicle part 22; however these gap parts may be also disposed in the middle circle part 23. In FIG. 4, 22' represents the cushion layer 10 and adhesive layer 9 in the outer circle part 22, 23' represents the cushion layer 10 and adhesive layer 9 in the middle circle part 23 and 24' represents the cushion layer 10 and adhesive layer 9 in the outer circle part 24.

The gap part has a size (a width or a length) of preferably 10 μm to 500 μm and more preferably 50 μm to 100 μm. The number of the gap part is preferably 2 to 100 (in the middle circle part, 0 to 100), more preferably 4 to 20.

Figure 5A:
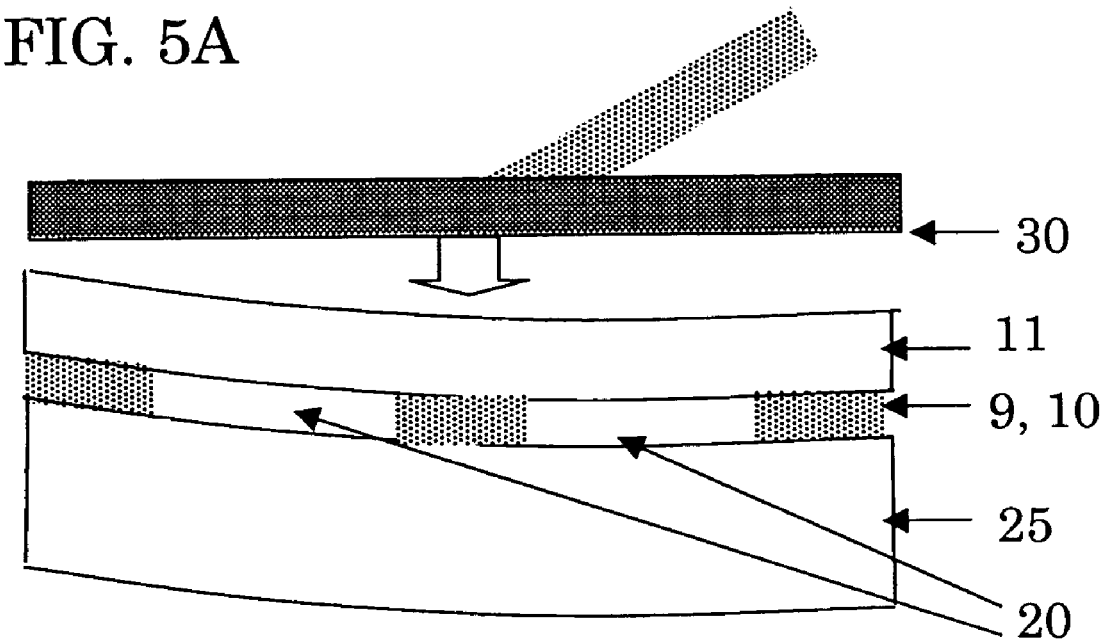
FIGS. 5A and 5B are section views schematically showing the laminating of the optical information layer and the reversible thermosensitive layer.
Figure 5B:
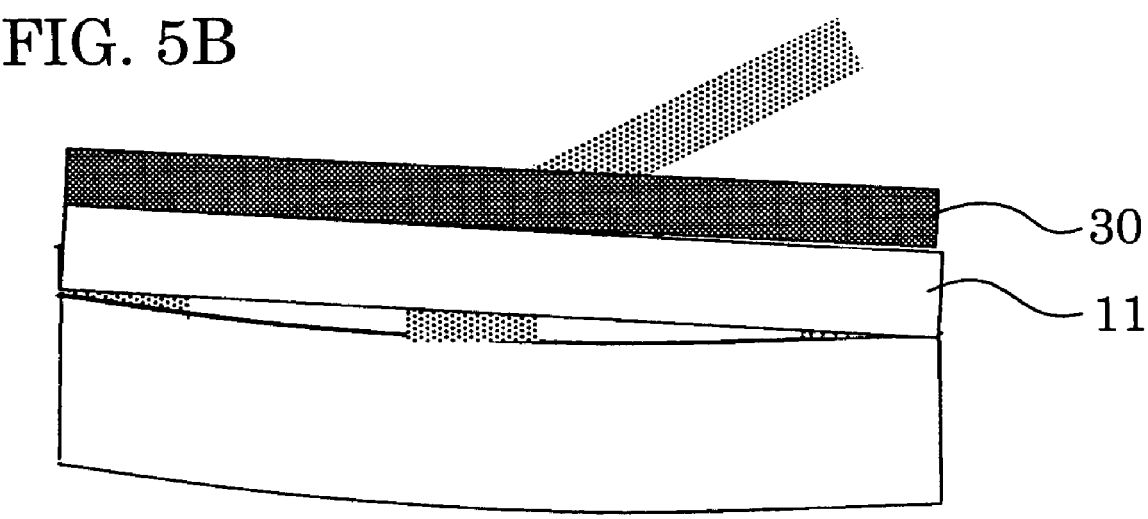

As shown in FIGS. 5A and 5B, since the cushion layer 10 and the adhesive layer 9 are disposed between the optical information layer and the reversible thermosensitive layer 11, when the thermal head 30 is contacted with the surface of the optical information recording medium, the thermal head 30 and the reversible thermosensitive layer 11 can be uniformly contacted with each other by the virtue of the cushion layer irrespective of the warpage direction of the optical information layer, such as an upward warpage and a downward warpage and the heat is uniformly transmitted to the whole region of the optical information recording medium, so that the uniformity of the image is improved and it is advantageous. FIG. 5A shows a state before the contacting (25 represents the optical recording member) and FIG. 5B shows a state aftrer the contacting.

It is preferred that in the optical information recording medium according to the present invention, the reversible thermosensitive layer has a thickness distribution having a form corresponding to the form of the warpage distribution of the optical information layer from the inner circle part to the outer circle part. Since in the optical information recording medium, the reversible thermosensitive layer has a thickness distribution having a form corresponding to the form of the warpage distribution of the optical information layer from the inner circle part to the outer circle part, even if a gap between the thermal head 30 and the optical information recording medium is caused and accordingly the adhesion between the thermal head and the reversible thermosensitive layer is poor, the heat applied by the thermal head 30 can be uniformly transmitted to the reversible thermosensitive layer.

Figure 6:
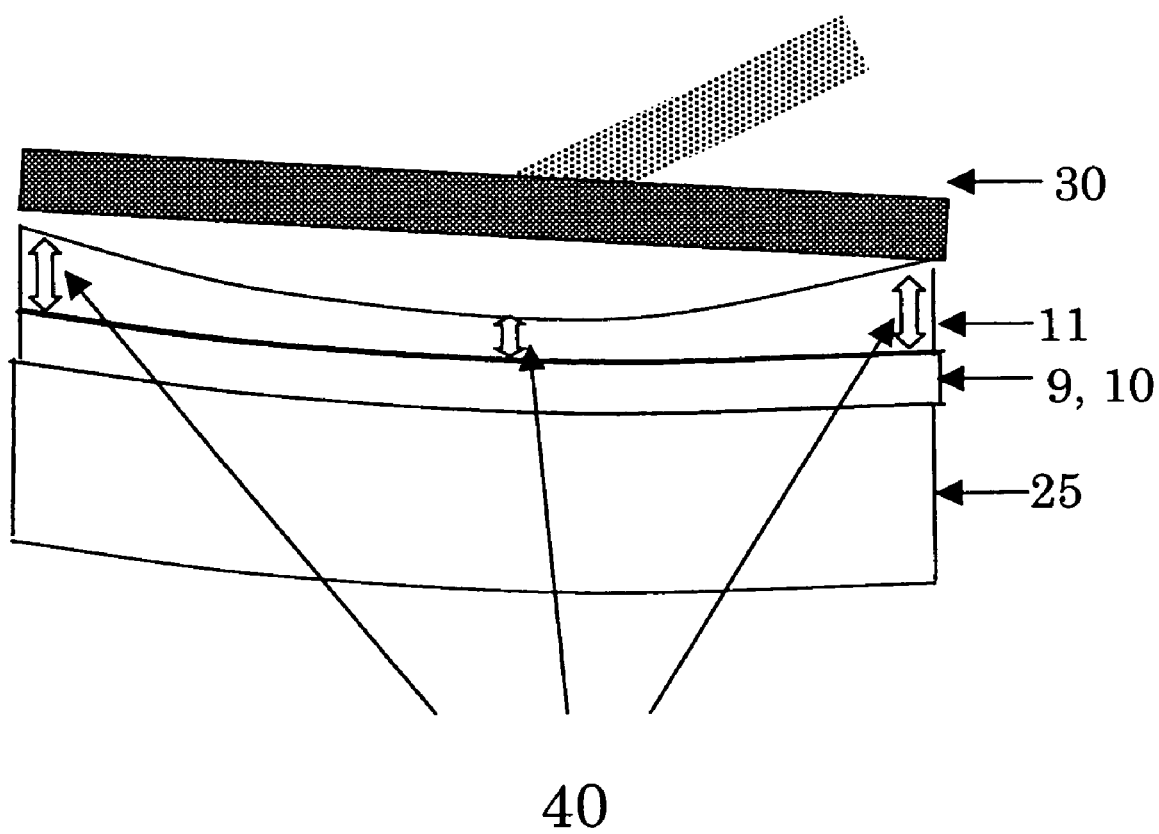
FIG. 6 is another section view schematically showing the laminating of the optical information layer and the reversible thermosensitive layer.

As shown in FIG. 6, for example, when the optical information layer of the optical information recording medium has an upward warpage, by lessening the thickness of the reversible thermosensitive layer 11 in the middle circle part of the disc where the gap between the thermal head 30 and the optical information recording medium is maximum through causing the reversible thermosensitive layer 11 to have a thickness distribution having a concave form from the inner circle part to the outer circle part of the disc, the heat applied by the thermal head 30 can be uniformly transmitted to the inner circle part, middle circle part and outer circle part of the optical information recording medium, so that an uniform image can be formed. In other words, the larger the gap between the thermal head 30 and the reversible thermosensitive layer 11 is, the thinner the thickness of the reversible thermosensitive layer 11 is caused to be (40). In FIG. 6, 9 represents the adhesive layer and 25 represents the optical recording member.

On the contrary, (it is not illustrated in FIG. 6), when the optical information layer of the optical information recording medium has an downward warpage, by lessening the thickness of the reversible thermosensitive layer in the inner and outer circle parts of the disc where the gap between the thermal head and the optical information recording medium is maximum through causing the reversible thermosensitive layer to have a thickness distribution having a convex form from the inner circle part to the outer circle part of the disc, the heat applied by the thermal head 30 can be uniformly transmitted to the inner circle part, middle circle part and outer circle part of the optical information recording medium, so that an uniform image can be formed.

The reversible thermosensitive layer has a thickness distribution in which the diference between the maximum thickness and minimum thickness is preferably 5 μm to 50 μm, more preferably 10 μm to 30 μm.

<Optical Information Layer>

The optical information layer of the optical information recording medium according to the present invention is not restricted so long as in the optical information layer, the information can be recorded by the optical change caused in the recording layer by irradiating a laser. Examples of the recording layer include a phase-changing recording layer and a recording layer comprising an organic dye.

Figure 1:
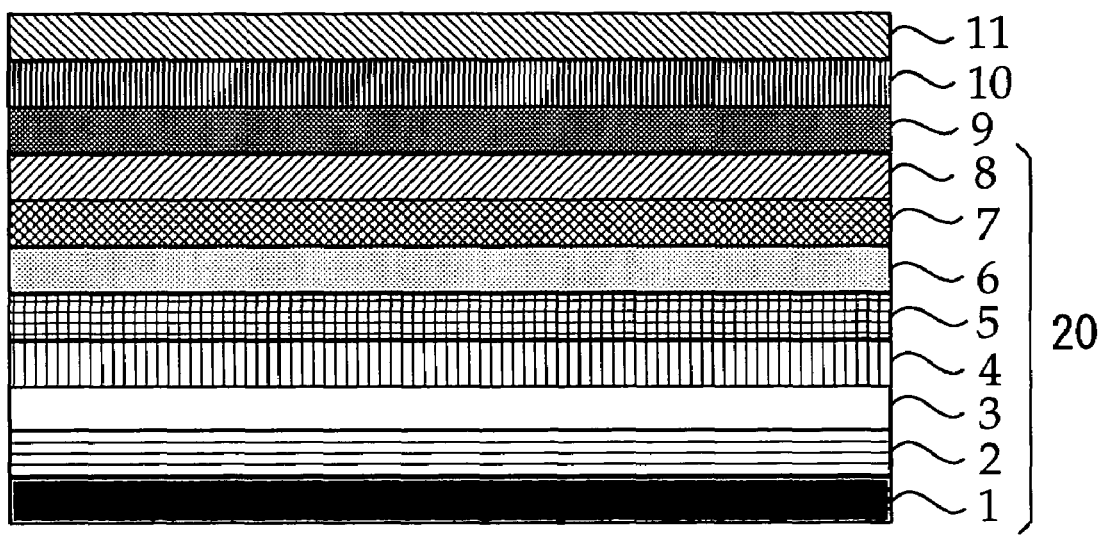
FIG. 1 is an explanatory section view schematically showing an example of the layer composition of the optical information recording medium having the reversible display function according to the present invention.
Figure 3:
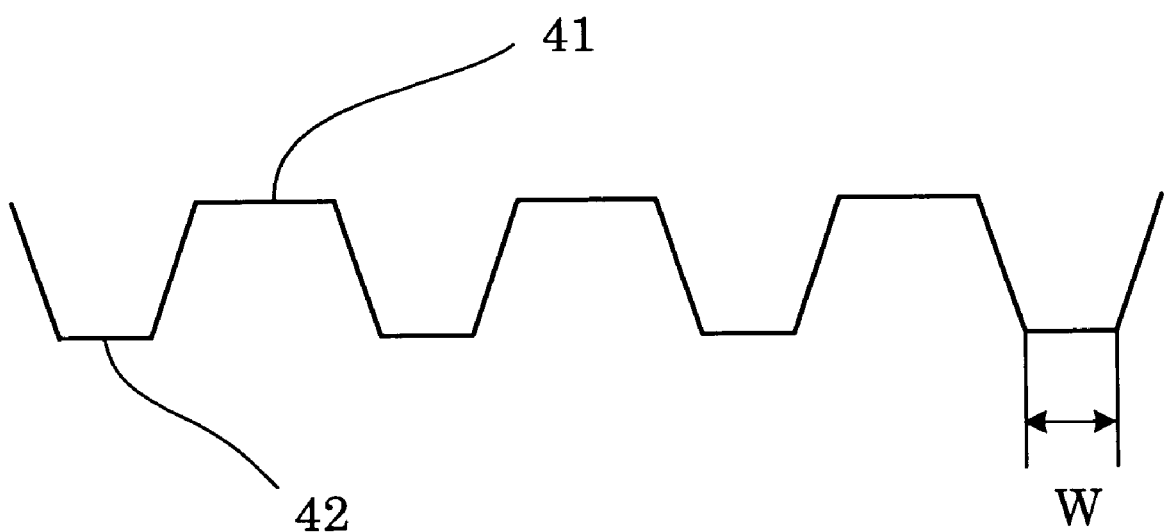
FIG. 3 is an explanatory view showing a guide groove (41 represents a land, 42 represents a groove and W represents the width of the groove bottom) in the surface of the substrate of the optical information recording medium.

FIG. 1 is an explanatory section view schematically showing an example of the fundamental layer composition of the optical information recording medium having a phase-changing recording layer (DVD+RW or DVD-RW medium) according to the present invention. 1 represents a substrate, 2 represents a first protective layer (inorganic protective layer), 3 represents a recording layer, 4 represents a second protective layer (inorganic protective layer), 5 represents a reflective layer, 6 represents a resinous protective layer (organic protective layer), 7 represents a tacky layer, 8 represents a cover substrate, 9 represents an adhesive layer, 10 represents a cushion layer, 11 represents a reversible thermosensitive layer, and the recording and reproducing are performed by irradiating a light to the substrate 1. Information is recorded and reproduced by the application of light from the substrate 1 side. In the surface of the substrate 1, guide grooves are formed as shown in FIG. 3 (41 represents a land, 42 represents a groove and W represents the width of the groove bottom). The adhesive layer 9 and cushion layer 10 are as noted above.

-Phase-changing Recording Layer-

The phase-changing recording layer according to the present invention utilizes such a principle of the phase-changing recording like in DVD+RW and CD-RW that an amorphous mark is formed in the recording layer by irradiating a laser light to the recording layer and by cooling rapidly the recording layer. Examples of the material used for producing the recording layer include an alloy thin film comprising chalcogens, such as Ge—Te, Ge—Te—Sb and Ge—Sn—Te. Among them, a thin film comprising an Sb—Te eutectic is extremely excellent in the sensitivity and rate of the recording (rendering to amorphous) and the erasuring ratio, so that the thin film comprising an Sb—Te eutectic is suitable as a material for producing the recording layer. For improving more the performance and reliability of the recording layer, the material for producing the recording layer may contain other elements, such as Ag, In and Ge or imputities. The recording layer has a thickness of preferably 50 andstroms to 200 angstroms. When the thickness is less than 50 angstroms, the repeating recording properties of the recording layer are lowered. On the other hand, when the thickness is more than 200 angstrom, the transmittance of the recording layer is lowered.

Examples of the disposing method of the recording layer include various vapor-phase epitaxies, such as a vacuum metallizing, a sputtering, a plasma chemical vapor deposition (plasma CVD), a photochemical vapor deposition, an ion plating and an electron-beam metallizing. Among them, a sputtering is excellent in the mass productivity and the film quality.

-First and Second Protective Layers-

The first and second protective layers have the functions of preventing the deterioration of the recording layer and enhancing the adhesion strength and recording properties of the recording layer. Examples of the material used for producing these protective layers include a metal oxide, such as SiO, $SiO_2$, ZnO, $SnO_2$, $Al_2O_3$, $TiO_2$, $In_2O_3$, MgO and $ZrO_2$; a nitride, such as $Si_3N_4$, AlN, TiN, BN and ZrN; a sulfide, such as ZnS, $In_2S_3$ and $TaS_4$; a carbide, such as SiC, TaC, $B_4C$, WC, TiC and ZrC; a diamond-like carbon (DLC); and a mixture thereof. Among them, a mixture of ZnS and $SiO_2$ is preferred. The mixture of ZnS and $SiO_2$ is excellent in heat resistance, low thermal conductivity properties and chemical stability. Accordingly, the protective layer produced using the mixture of ZnS and $SiO_2$ has a low residual stress and excellent adhesion properties with the recording layer and in such a protective layer, the deterioration in properties, such as the recording sensitivity and the erasing ratio is difficultly caused even after the repeating of at least one of the recording and erasing, so that the above-noted mixture is preferred as the material used for producing the reflective layer.

Examples of the layer disposing method for the first and second protective layers include various vapor phase epitaxies, such as a vacuum metallizing, a sputtering, a plasma CVD, a photo CVD, an ion plating and an electron-beam metallizing. Among them, a sputtering is excellent in the mass productivity and the film quality.

The thickness of the first and second protective layers is not restricted and may be properly selected depending on the application. Usually, the first protective layer has a thickness of preferably 50 nm to 90 nm.

-Reflective Layer-

While the reflective layer performs the function as a reflective layer, the reflective layer performs the function as a heat-dissipating layer by which the heat applied to the recording layer by the irradiation of a laser light during the recording is caused to escape out of the optical information recording medium. Since the foming of an amorphous mark varies largely depending on the cooling rate of the heat dissipation, the selection of the reflective layer is particularly important in a medium responding to a high linear speed. Selection of the reflective layer is important typically in an optical information recording medium for use in high-speed recording, since the formation of an amorphous mark is significantly affected by the cooling rate by the action of heat dissipation.

Examples of the material used for producing the reflective layer include a metal, such as Al, Au, Ag, Cu and Ta and an alloy thereof. As an additive element to the above-noted metal material, an element, such as Cr, Ti, Si, Cu, Ag, Pd and Ta can be used. Among them, the reflective layer comprises preferably at least one of Ag and an Ag alloy, because, from the viewpoint of the thermal conductivity controlling the cooling rate of the heat generated during the recording and from the viewpoint of optical properties improving the contrast of the reproducing signal by utilizing the interference effect, the reflective layer comprises preferably a metal having a high thermal conductivity and a high reflectance and Ag (of pure Ag or in an Ag alloy) has an extremely high thermal conductivity of 427 W/m·K, so that immediately after the recording layer has reached to a high temperature during the recording, a rapidly-cooled structure which is suitable for the forming of the amorphous mark can be obtained.

Considering thus a high thermal conductivity, silver is the best; however, considering the corrosion resistance, the reflective layer may also comprise copper. In this case, so as not to impair the properties of silver, the amount of copper is preferably 0.1 atomic % to 10 atomic %, most preferably 0.5 atomic % to 3 atomic %. An excessive amount of copper may adversely impair the corrosion resistance of silver.

The reflective layer can be disposed accoding to various vapor phase epitaxies, such as a vacuum metallizing, a sputtering, a plasma CVD, a photo CVD, an ion plating and an electron-beam metallizing. Among them, a sputtering is excellent in the mass productivity and the quality of the film.

The dissipation capability of the reflective layer is fundamentally proportional to the thickness thereof. The reflective layer has the thickness of preferably 60 nm to 300 nm.

On the reflective layer, optionally a resinous protective layer may be disposed. The resinous protective layer has the function to protect the recording layer during or after the production of the optical information recording medium and is usually disposed using an ultraviolet-curing resin. The resinous protective layer has a thickness of preferably 2 μm to 5 μm.

-Third Protective Layer-

Between the reflective layer and the protective layer, a third protective layer which is substancially free from sulfur is preferably disposed as a barrier layer.

Examples of the material used for producing the third protective layer include Si, SiC, SiN, GeN and $ZrO_2$. Among them, Si or SiC is preferred from the viewpoint of a particularly high barrier properties.

When the reflective layer comprises pure Ag or an Ag alloy and the protective layer comprises a sulfur-containing material, such as a mixture of ZnS and $SiO_2$, the sulfur is diffused into the reflective layer comprising Ag, so that a disadvantage is caused wherein the optical information recording medium has a defect (i.e., Ag is subjected to the sulfuration reaction). Accordingly, for preventing the sulfuration reaction, from viewpoints, such as (1) having the function of preventing a sulfuration reaction of Ag as a barrier, (2) having an optical transparency to a laser light, (3) having a low thermal conductivity for forming the amorphous mark, (4) having advantageous adhesion properties with the protective layer and reflective layer and (5) easiness for disposing the layer, the material used for producing the third protective layer is desirably properly selected and a material mainly comprising Si or SiC and satisfying the above-noted requirements is preferred as a material used for producing the third protective layer.

The third protective layer has a thickness of preferably 2 nm to 20 nm, more preferably from 2 nm to 10 nm. When the thickness is less than 2 nm, the third protective layer may not function as a barrier layer. On the other hand, when the thickness is more than 20 nm, the modulation degree of the optical information recording medium may be lowered.

-Substrate-

Examples of an usual material used for producing the substrate include a glass, a ceramic and a resin. Among them, from the viewpoint of the moldability and the cost, a resin is preferred. Examples of the resin include a polycarbonate resin, an acrylic resin, an epoxy resin, a polystyrene resin, an acrylonitrile-styrene copolymer, a polyethylene resin, a polypropylene resin, a silicone resin, a fluorine resin, an ABS resin and an urethane resin. Among them, from the viewpoint of the moldability, optical properties and the cost, a polycarbonate resin and an acrylic resin are preferred.

In the substrate, a guide groove having a convex portion (41 represents a land) and a concave portion (42 represents a groove) is formed as shown in FIG. 3 (W represents the width of the groove bottom). Examples of the property of the recording medium which can be reproduced using a CD player, such as DVD+R and CD-R include a property in which the track information is recorded by the wobbling of a guide groove or a pit line. The wobbling of a guide groove can be detected as a wobbling signal from a track signal and by subjecting a specified wavelength to the frequency modulation (FM) or the phase modulation, the track information has been beforehand recorded in the substrate. Examples of the track information include an address information and an information of the rotation frequency of the disk and the track information has such a characteristic that when the track information is detected from the track signal, the track signal can be easily separated from the information data signal and the compatibility with ROM signals can be easily obtained. The groove formed on the substrate has a depth of preferably 100 andstroms to 400 angstroms and a width of preferably 0.1 μm to 0.35 μm.

The tacky layer for laminating a substrate in which an information signal is recorded to a substrate for the laminating is produced using a sheet having both adhesive, surfaces which is produced by applying an adhesive to the both surfaces of a base film, a thermosetting resin or an ultraviolet-curing resin. Usually, the tacky layer has a thickness of preferably around 50 μm.

When the tacky layer is produced using an adhesive sheet or a thermosetting resin, the substrate for the laminating (dummy substrate) needs not to be optically transparent; however, when the tacky layer is produced using an ultraviolet-curing resin, the above-noted substrate for the laminating is a transparent substrate transmitting an ultraviolet ray. The sustrate for the laminating has a thickness of usually 0.6 mm which is the same as the thickness of the tranparent substrate 1 in which the information signal is recorded.

Figure 2:
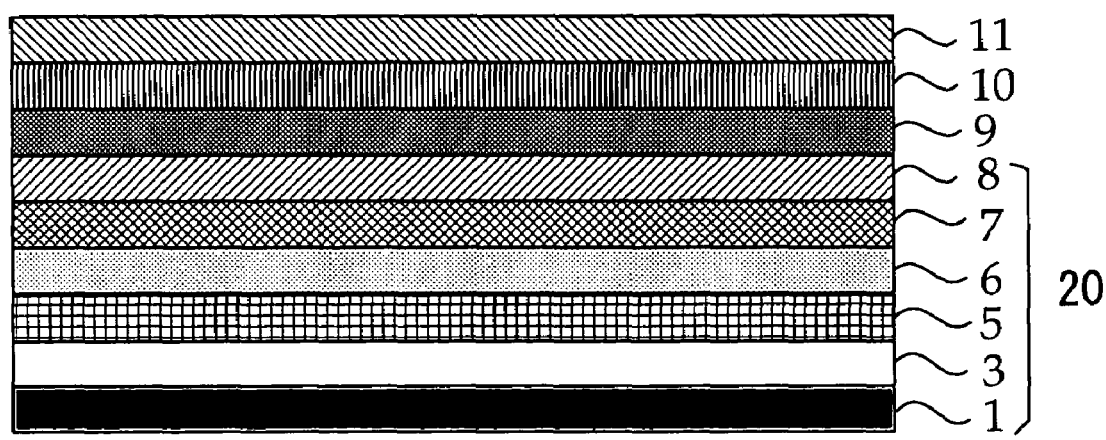
FIG. 2 is an explanatory section view schematically showing another example of the layer conposition of the optical information recording medium having the reversible display function according to the present invention.

FIG. 2 is an explanatory section view schematically showing a fundamental composition of an optical information recording medium (, such as DVD+R or DVD-R) in which the recording layer is produced using an organic dye material. 1 reperesents the substrate, 3 represents the recording layer comprising a dye, 5 represents the reflective layer, 6 reperesents the protective layer (organic protective layer), 7 represents the adhesive layer, 8 represents the cover substrate, 9 represents the adhesive layer, 10 represents the cushion layer, 11 represents the reversible thermosensitive layer, and the recording and reproducing are performed by irradiating a light to the substrate 1. In the substrate 1, a guide groove shown in FIG. 3 (41 represents a land, 42 represents a groove and W represents the width of the groove bottom) is formed. The adhesive layer 9 and the cushion layer 10 are as noted above.

-Recording Layer Comprising Dye-

In the recording layer, an optical change is caused by irradiating a laser light and by the optical change, the information can be recorded. The recording layer comprises at least an organic dye and further a binder and a stabilizer.

According to an aspect of the present invention, to the organic dye, a high reflectance is imparted by the multiple interference effect of the both interfaces of the recording layer comprising a dye. The recording layer comprising a dye needs to have optical properties, such as a high refractive index n and a relatively low absorbance k and the preferred range of the refractive index n is a range represented by the numerical formula: $n>2$, and the preferred range of an absorbance k is a range represented by the numerical formula: $0.03<k<0.2$. These optical properties can be obtained by utilizing the properties of the terminal at the longest wavelength in a light absorption zone of the recording layer comprising a dye. The organic dye is not restricted and may be properly selected depending on the application. Examples of the organic dye include a cyanine dye, a phthalocyanine dye, a pyrylium/thiopyrylium dye, an azulenium dye, a squarylium dye, an azo dye, a formazan-chelate dye, a complex-salt dye of a metal, such as Ni and Cr, a naphthoquinone/anthraquinone dye, an indophenol dye, an indoaniline dye, a triphenylmethane dye, a triallylmethane dye, an aminium/diiminium dye and a nitroso compound. Among them, preferred examples of the dye compound which has a wavelength for the maximum absorbance in the light absorption spectrum of 550 nm to 650 nm, and by which a desired optical property can be easily obtained at a laser light wavelength (about 650 nm), include, from the viewpoint of the easiness for controlling film formation properties in the film formation by applying the solvent and the optical properties of the recording layer comprising the dye, a tetraazaporphyrazine dye, a cyanine dye, an azo dye and a squarylium dye.

The dye may comprise a polymer material. Examples of the polymer material include an ionomer resin, a polyamide resin, a vinyl resin, a natural polymer, a silicone, a liquid rubber and a silane coupling agent mixed with the dye and dispersed. For improving the properties of the recording layer comprising the dye, the dye may comprise further an additive (e.g., complex of a transition metal), a dispersant, a flame retardant, a lubricant, an antistatic, a surfactant and a plasticizer.

The recording layer comprising the dye has a thickness of from 100 angstroms to 5,000 angstroms, more preferably from 500 angstroms to 2,000 angstroms. When the thickness is less than 100 angstroms, the recording sensitivity of the recording layer is sometimes lowered.

On the other hand, when the thickness is more than 5,000 angstrom, the reflectance of the recording layer is sometimes lowered.

The disposing of the recording layer can be peformed according to a conventional process, such as a metallizing, a sputtering, a chemical vapor deposition (CVD) and a liquid coating. When the liquid coating is used, the coating is performed using a dye dissolved in an organic solvent according to a convetional coating, such as a spraying, a roller coating, a dipping or a spin coating.

The organic solvent is not restricted and may be properly selected depending on the application. Examples of the organic solvent include an alcohol, such as methanol, ethanol, isopropanol and 2,2,3,3-tetrafluoropropanol; a ketone, such as acetone, methyl ethyl ketone and cyclohexanone; an amide, such as N,N-dimethylformamide and N,N-dimethylacetamide; a sulfoxide, such as dimethyl sulfoxide; an ether, such as tetrahydrofuran, dioxane, diethyl ether and ethylene glycol monomethyl ether; an ester, such as methyl acetate and ethyl acetate; a halogenated fatty hydrocarbon, such as chloroform, methylene chloride, dichloroethane, carbon tetrachloride and trichloroethane; an aromatic hydrocarbon, such as benzene, xylene, monochlorobenzene and dichlorobenzene; a cellosolve, such as metoxyethanol and ethoxyethanol; and a fatty hydrocarbon, such as hexane, pentane, cyclohexane and methylcyclohexane.

-Undercoating Layer-

The optical information recording medium according to the present invention may optionally comprise further an undercoating layer.

Examples of the objects for which the undercoating layer is used include (1) improving adhesion properties, (2) preventing from water or a gas as a barrier, (3) improving the shelf stability of the recording layer, (4) improving the reflectance, (5) protecting the substrate and recording layer from a solvent and (6) forming a guide groove/a guide pit/a preformat.

Examples of the polymer material which can be used for the object (1) include ionomer resins, polyamides, vinyl resins, naturally-occurring resins and polymers, silicone resins and liquid rubber, as well as silane coupling agents. Examples of the material which can be used for the objects (2) and (3) include besides the above-noted polymer material, an inorganic compound, such as $SiO_2$, $MgF_2$, SiO, $TiO_2$, ZnO, TiN and SiN; and a metal and a semimetal, such as Zn, Cu, Ni, Cr, Ge, Se, Au, Ag and Al. Examples of the material which can be used for the object (4) include a metal, such as Al and Ag; and an organic thin film having a metallic gloss, such as a thin film of a methine dye or a xanthene dye. Examples of the material which can be used for the objects (5) and (6) include an ultraviolet-curing resin, a thermosetting resin and a thermoplastic resin.

The thickness of the undercoating layer is not restricted and may be properly selected depending on the application. The thickness is preferably 0.01 μm to 30 μm, more preferably 0.05 μm to 10 μm.

-Reflective Layer and Substrate-

As a material used for producing the reflective layer and the substrate, the same material as a material used for producing the above-noted optical information recording medium having the phase-changing recording layer can be used.

-Protective Layer and Hardcoat Layer in Surface of Substrate-

Examples of the objets for which the protective layer or the hardcoat layer in the surface of the substrate include (1) protecting the recording layer from a scratch, a dust and a stain, (2) improving the shelf stability of the recording layer and (3) improving the reflectance. For these objects, SiO and $SiO_2$ can be used. As an organic material for the above-noted objects, a conventional ultraviolet-curing resin can be used. Examples of the ultraviolet-curing resin include an acrylate resin, such as hydroxyethyl (meth)acrylate, hydroxypropyl (meth)acrylate, hydroxybutyl (meth)acrylate, hydroxypentyl (meth)acrylate, phenoxyhydroxypropyl (meth)acrylate, chlorohydroxypropyl (meth)acrylate, diethylene glycol mono(meth)acrylate, triethylene glycol mono(meth)acrylate, polyethylene glycol mono(meth)acrylate, dipropylene glycol mono(meth)acrylate, polypropylene glycol mono(meth) acrylate, glycerol mono(meth)acrylate, glycerol di(meth) acrylate, pentaerythritol (meth)acrylate, phenyl glycidyl ether (meth)acrylate, dipentaerythritol penta(meth)acrylate and di(meth)acrylate of bisphenol A epoxy resin. These materials can be used individually or in combination.

Examples of the free-radical initiator used for curing the ultraviolet-curing resin include an acetophenone derivative, such as 1-hydroxycyclohexyl phenyl ketone, 2-hydroxy-2-methyl-1-phenylpropane-1-one, 2,2-diethoxyacetophenone and 4-phenoxy-2,2-dichloroacetophenone; a propiophenone derivative, such as 2-hydroxy-2-methylpropiophenone; an anthraquinone derivative, such as 2-chloroanthraquinone; and an thioxanthone derivative, such as 2,4-diethylthioxanthone. Usually, the mass ratio of the free-radical initiator to the material used for producing the hardcoat layer is preferably 1% by mass to 10% by mass. These free-radical initiators can be used individually or in combination.

The organic material used for producing the hardcoat layer may further comprise a crosslinkable monomer. Examples of the crosslinkable monomer include trimethylolpropane tri (meth)acrylate, acrylated isocyanurate, 1,4-butanediol di(meth)acrylate, 1,6-hexanediol di(meth)acrylate, neopentyl glycol di(meth)acrylate, dicyclopentadienyl di(meth) acrylate and pentaerythritol tetra(meth)acrylate. These materials may be used individually or in combination. The organic material may further comprise an antifoaming agent or a tackifier, such as silica.

The hardcoat layer in the surface of the substarte has a thickness of preferably 1 μm to 30 μm.

According to the present invention, the undercoat layer, protective layer and hardcoat layer in the surface of the substrate may further comprise depending on the application, a stabilizer, a dispersant, a flame retardant, a lubricant, an antistatic, a surfactant and a plasticizer, like the recording layer.

-Adhesive and Tacky Layer-

The adhesive is not restricted so long as two recording media can be adhesive-bonded to each other by the adhesive and may be properly selected depending on the application. Preferred examples of the adhesive include an adhesive which exhibits an adhesive action by irradiating an ultraviolet ray to the adhesive (ultraviolet-curing adhesive), such as an ultraviolet-curing adhesive and a cationic ultraviolet-curing adhesive. The ultraviolet-curing adhesive is applied to a surface which is to be adhesive-bonded of at least one of two substrates according to, for example a spinning coating. The ultraviolet-curing resin tacky layer has a thickness of preferably 5 μm to 50 μm.

-Protective Substrate-

When a laser light is irradiated to the protective substrate of the recording medium, the protective substrate should be optically transparent to a used laser light and when the protective layer is used only as a protective plate, it is no question whether it is transparent or not. Examples of the material used for producing the protective substrate, like that used for producing the protective substrate include a plastic, such as a polyester, an acrylic resin, a polyamide, a polycarbonate, a polyolefin, a phenolic resin, an epoxy resin and a polyimide, a glass, a ceramic and a metal.

<Reversible Thermosensitive Layer>

Figure 12:
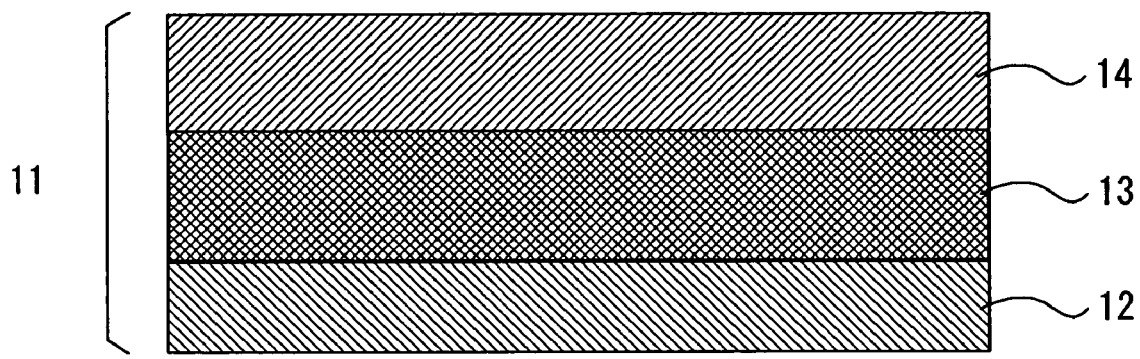
FIG. 12 is a section view schematically showing an example of the layer composition of the reversible thermosensitive layer.

The reversible thermosensitive layer of the optical information recording medium according to the present invention comprises a resin, an organic low-molecular weight compound and optionally other components. The reversible thermosensitive layer comprises at least a reversible thermosensitive recording layer in which at least a part of the information recorded in the optical information layer can be recorded in such a manner that a recorded information can be visually recognized and optionally other layers. As shown in FIG. 12, the reversible thermosensitive layer 11 comprises, for example, a support 12, a reversible thermosensitive recording layer 13 and a protective layer 14. In the reversible thermosensitive recording layer 13, by contacting the thermal head with the protective layer 14, the printing and erasing can be performed.

The material used for producing the reversible thermosensitive recording layer is not restricted and may be selected depending on the application. Examples of the material for the reversible thermosensitive recording layer include an electrochromic material, a photochromic material, a thermochromic material, a magnetic recording material, a bistable liquid crystal material and a thermoreversible recording material. Among them, a material which changes the state thereof to a state having a first transparency or color tone by applying an energy to the material and changes the state thereof to a state having a second transparency or color tone by applying the same or a different energy as or from the above-noted energy again, wherein the first and second transparency or color tone can be maintained without applying an energy thereto, is preferred. In this case, examples of the applied energy include a light, a heat, an electric field and a magnetism. Among them, from the viewpoint of stability and cost, the heat is preferred.

The material used for producing the reversible thermosensitive recording layer is not restricted so long as the material can reversibly change the transparency or color tone thereof by applying a heat thereto and is preferably a material which can maintain two or more states thereof at a normal temperature without applying an energy thereto, wherein the two or more states have a different transparency and/or a different color tone from each other. In the present invention, "the color tone is reversibly changed depending on the temperature" means a phenomenone in which according to the temperature change, a visible change is reversibly caused in the state and by the difference in a heating temperature and a cooling rate after the heating, a relatively color-developped state and a relatively color-erased state can be formed. Examples of such materials include a mixture of two or more polymers in which the state of the mixture is changed to transparent or opaque according to the difference in the compatibilized state of the mixture (see JP-A No. 61-258853), a material utilizing the phase-change of a liquid crystal polymer (see JP-A No. 62-66990) and a material which changes the state thereof into a first color state by heating the material at a first specific temperature which is higher than a normal temperature and changes the state thereof into a second color state by heating the material at a second specific temperature which is higher than the first specific temperature and by cooling the material.

The resin used for producing the reversible thermosensitive recording layer has a glass transition point (Tg) of preferably 60° C. to 120° C., more preferably 70° C. to 100° C. When the glass transition point is too low, the heat resistance of the image is lowered sometimes. On the other ahnd, when the glass transition point is too high, a disadvantage is caused wherein the erasing properties of the reversible thermosensitive recording layer is lowered.

The resin used for producing the reversible thermosensitive recording layer is not restricted and may be properly selected depending on the application. Examples of the resin include a vinyl chrroride polymer, such as a polyvinyl chloride resin, a vinyl chloride-vinyl acetate copolymer, a vinyl chloride-vinyl acetate-vinyl alcohol copolymer, a vinyl chloride-vinyl acetate-maleic acid copolymer and a vinyl chloride-acrylate copolymer; a vinylidene chloride polymer, such as a polyvinylidene chloride resin, a vinylidene chloride-vinyl chloride copolymer and a vinylidene chloride-acrylonitrile copolymer; a polyester resin; a polyamide resin; a polyacrylate resin, a polymethacrylate resin and an acrylate-methacrylate copolymer; a silicone resin; a polyethylene resin, a polypropylene resin, a polystyrene resin, a polyacrylamide resin, a polyvinylpyrrolidone resin, a natural rubber, a polyvinyl alcohol resin, a polyacrolein resin and a polycarbonate resin. These resins may be used individually or in combination. Among them, a vinyl chloride polymer, such as a polyvinyl chloride, a vinyl chloride-vinyl acetate copolymer, a vinyl chloride-vinyl acetate-vinyl alcohol copolymer, a vinyl chloride-vinyl acetate-maleic acid copolymer and a vinyl chloride-acrylate copolymer.

For improving the repeating durability, the above-noted resins are preferably cross-linked. Preferred examples of the crosslinking method include a cross-linking by the heat, a cross-linking by an ultraviolet light and a cross-linking by an electron beam. For cross-linking the resin used for producing the reversible thermosensitive recording layer, the resin comprises preferably various cross-linking agents. Examples of the cross-linking agent include a cross-linking agent having an isocyanate group for a cross-linking by the heat of a vinyl chloride-vinyl acetate-vinyl alcohol copolymer and a cross-linking agent of a (meth)acrylate monomer or oligomer for a cross-linking by an ultraviolet light or electron beam of the resin. These cross-linking agents should not be construed as limiting the scope of the present invention. The above-noted resins, cross-linking agents and cross-linking methods are described in JP-A Nos. 64-62368, 03-227688, 07-96679 and 07-172072.

The organic low-molecular weight compound is not restricted so long as the compound can be present in the form of a particle in the reversible thermosensitive recording layer. Generally, the organic low-molecular weight compound has a melting point of preferably 30° C. to 200° C., more preferably 50° C. to 200° C. Preferred examples of such an organic low-molecular-weight compound include a compound containing a long-chain. The carbon number of the long-chain hydrocarbon is preferably 6 to 50, more preferably 8 to 40, still more preferably 10 to 30. These carbon atom numbers indicate a total of carbon atoms in the long-chain hydrocarbon and may be divided into two or more long-chain hydrocarbon moieties in one molecule of the long-chain hydrocarbon compound.

It is preferred that as the organic low-molecular-weight compound, a mixture of a compound having a low melting point and an compound having a high melting point is used. The difference between the melting point of a compound having a low melting point and a compound having a high melting point is preferably 30° C. or more, more preferably 40° C. or more, most preferably 50° C. or more. By using the organic low-molecular weight compound in combination of some types thereof having a different melting point from that of each other, the temperature range in which the reversible thermosensitive recording layer is transparent can be expanded. The melting point of the organic low-molecular-weight compound having a low melting poit is preferably 50° C. or more, more preferably 70° C. or more, still more preferably 80° C. or more, preferably less than 100° C. The higher the melting point of the organic low-molecular weight compound having a low-melting point is, the more the heat resistance of the image is improved. The melting point of the organic low-molecular weight compound having a high melting point is preferably 100° C. to 200° C., more preferably 120° C. to 180° C., most preferably 130° C. to 170° C. When the melting point of the organic low-molecular weight compound having a high melting point is enhanced, the melting point difference between the organic low-molecular weight compound having a high melting point and the organic low-molecular weight compound having a low-melting point is enlarged and the temperature range in which the reversible thermosensitive recording layer is transparent is expanded, so that the reversible thermosensitive recording layer can be easily rendered to be transparent even when the processing rate of the recording medium is enhanced. On the other hand, when the melting point of the organic low-molecular weight compound having a high melting point, the sensitivity of the image forming is sometimes improved.

The organic low-molecular weight compound having a low melting point is not restricted and may be properly selected depending on the application. Examples of the organic low-molecular weight compound having a low melting point include a fatty acid ester, a dibasic acid ester, a difatty acid ester of a polyhydric alcohol, a ketone having a higher alkyl group, a fatty acid, an alkyl amide and an alkyl urea. These compounds may be used individually or in combination.

The organic low-molecular weight compound having a high melting point is not restricted and may be properly selected depending on the application. Examples of the organic low-molecular weight compound having a high melting point include a saturated fatty dicarboxylic acid, a semicarbazone derived from a ketone having a higher alkyl group, a α-phosphono fatty acid, a fatty amide, a fatty bisamide, an alicyclic dicarboxylic acid and a fatty acid containing a steroid skeleton. These compounds can be used individually or in combination.

As the above-noted organic low-molecular weight compound, all of the conventional compounds and the conventional combinations thereof described in JP-A Nos. 02-1363, 03-2089, 05-77549, 05-96850, 05-124343, 05-294062, 06-48024 and 08-20167 can be used.

The mixing mass ratio of the organic low-molecular weight compound having a low melting point and the organic low-molecular weight compound having a high melting point is preferably 95:5 to 5:95, more preferably 90:10 to 10:90 and most preferably from 80:20 to 20:80. The mixing mass ratio of the organic low-molecular weight compound and the resin in the reversible thermosensitive layer is preferably from about 1:2 to 1:16, more preferably from about 1:2 to 1:8, still more preferably 1:2 to 1:4. When the mixing ratio of the resin is a least one in the above-noted range or less, the film in which an organic low-moleculer weight compound is supported in a resin can be sometimes difficultly shaped. On the other hand, when the mixing ratio of the resin is a most one in the above-noted range or more, since the amount of the organic low-molecular weight compound is too small, so that the organic low-molecular weight compound can be difficultly rendered to be transparent sometimes.

The reversible thermosensitive recording layer may comprise besides the above-noted components, for making the transparent image-forming easy an additive, such as a surfactant and a plasticizer. These additives are disclosed in JP-A Nos. 63-104879 and 63-178079.

Next, with referring to an electron-donating color-developing compound (e.g., a leuco dye) and an electron accepting compound (color developer), with respect to a reversible thermosensitive recording material which can perform the color-developping and color-erasing, explanations are given in detail. The reversible thermosensitive recording material can be produced by dispersing a leuco dye and a color developer in a binder resin.

The leuco is not restricted and may be properly selected depending on the application. Examples of the leuco dye include a triphenylmethane phthalide compound, a fluorane compound, a phenothiazine compound, a leuco auramine compound and an indolinophthalide compound.

The color developer has in the molecule a structure having the function of developing the color of the leuco dye, for emaple a structure controlling an intermolecular coagulation force in the cooperation with a phenolic hydroxyl group, a carboxyl group or a phosphoric acid group and a structure in which a long-chain hydrocarbon group is bonded. The two structures may be connected through a divalent group containing a hetero atom. The long-chain hydrocarbon group may also contain a divalent group containing a hetero atom or an aromatic hydrocarbon group. Specific examples of such color developers include a conventional color developer described in JP-A No. 05-124360. The color developer has a melting point of preferably 120° C. to 200° C., more preferably 140° C. to 180° C. When the melting point of the color developer is too low, the color erasing properties of the reversible thermosensitive recording layer is lowered. On the other hand, when the melting point of the color developer is too high, the energy required for forming the image becomes high, so that a disadvantage is caused wherein the sensitivity of the reversible thermosensitive recording layer is lowered.

Figure 13:
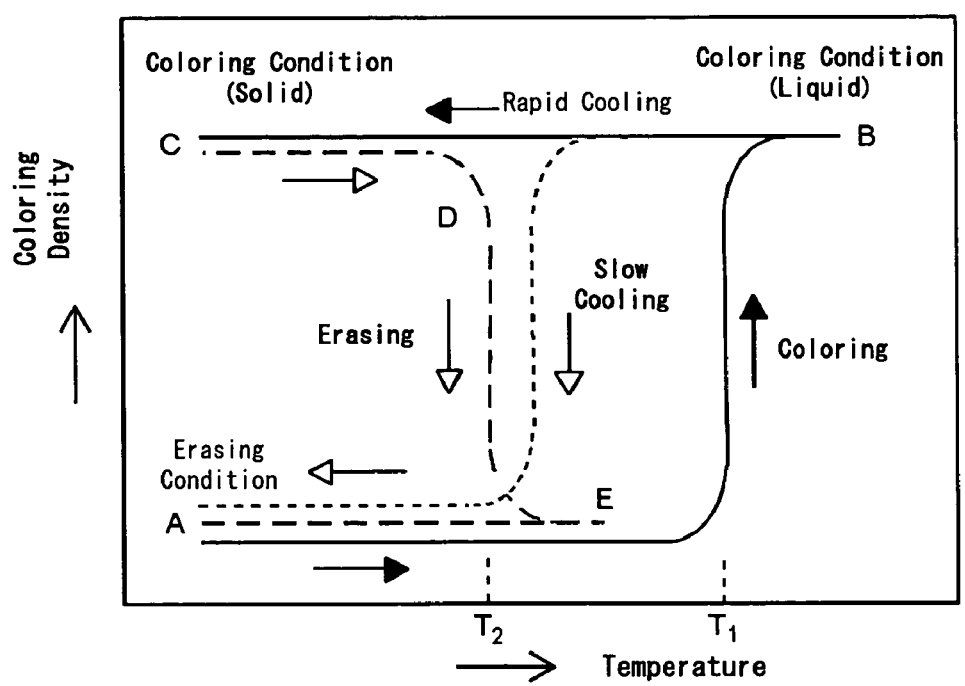
FIG. 13 is an explanatory view schematically showing the principle of the color developing and color erasing in the reversible thermosensitive layer.

FIG. 13 is a diagram showing the relationship between the temperature and the color developing density of the composition produced by dispersing the leuco dye and the color developer in a binder resin. When the composition in the initial color-erased condition A is heated, a color of the composition is developed at the temperature $T_1$ where the composition begins to be molten and comes into the molten and color-developed condition B. When the composition in the molten and color-developed condition B is cooled rapidly, the temperature of the medium can be lowered to room temperature while the composition maintains the color-developed condition, thereby the composition comes into the solid color-developed condition C. Whether the composition can come into the solid color-developed condition C or not depends on the cooling rate from the molten and color-developed condition B as follows. When the composition in the molten and color-developed condition B is cooled slowly, the composition comes into the color-erased condition A or into a condition in which a density of the developed color is relative lower than a density of the developed color in the solid color-developed condition C. On the other hand, when the composition in the solid color-developed condition C is heated again, the color of the composition is erased at the temperature $T_2$ which is lower than the above-noted coloring temperature $T_1$ (from D to E) and from here (E), when the composition is cooled, the composition returns into the initial color-erased condition A.

The support is not restricted and may be properly selected depending on the application. Examples of the support include a polyimide film, an aramide film, a polyphenyl sulfide film and a polyester film. The support has a thickness of preferably 3 μm to 250 μm, more preferably 10 μm to 150 μm, still more preferably 20 μm to 100 μm. When the thickness is too small, a disadvantage is likely to be caused wherein during the coating and drying of the reversible thermosensitive recording layer or the adhesive-bonding of a label to the recording medium, a wrinkle is caused in the recording medium. When the thickness is too large, the memorizing or reading of the information in the disc driver has defect.

As a material used for producing the protective layer 14, a resin is preferred and a curable resin, such as a thermosetting resin, an ultraviolet-curing resin and an electron beam-curing resin is more preferred. Specific examples of the material include a silicone rubber, a silicone resin (see JP-A No. 63-221087), a polysiloxane graft polymer and an ultraviolet-curing resin and an electron beam-curing resin (see JP-A No. 03-205655). The protective layer 14 is particularly required for preventing the surface of the medium from damaging by a thermal and mechanical stress, when the thermal head is contacted with the optical information recording medium for heating the reversible thermosensitive layer.

The thickness of the protective layer 14 is not restricted and may be properly selected depending on the application. The thickness is preferably 0.1 µm to 20 µm, more preferably 0.5 µm to 10 µm.

Figure 14:
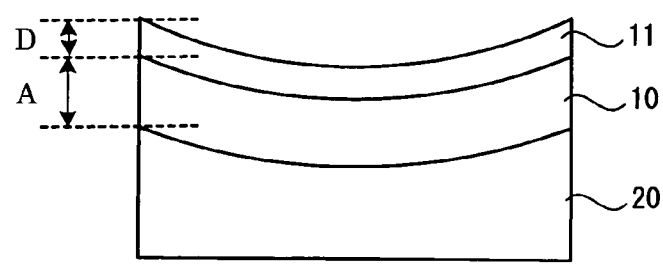
FIG. 14 is a section view schematically showing the relationship between the thickness of the reversible thermosensitive layer and the thickness of the cushion layer.

According to the present invention, as shown in FIG. 14, the thickness D (µm) (combined layer thickness of the support 12, the reversible thermosensitive recording layer 13 and the protective layer 14) of the reversible thermosensitive layer varies depending on the type of the material used for producing the reversible thermosensitive layer and usually is preferably 1.0 µm to 200 µm, more preferably 25 µm to 150 µm. When the cushion layer has a thickness of A (µm), A and D satisfy preferably the numerical formula: 60 µm≦A+D≦200 µm, more preferably the numerical formula: 75 µm≦A+D≦150 µm. Thus, since a CD disc, a CD-R disc, a CD-RW disc and a DVD video disc which are widely distributed in the world, have a thickness of about 1.2 mm, the infra of the world can be universely used.

(Manufacturing Method of Optical Information Recording Medium)

The manufacturing method of the optical information recording medium according to the present invention is, in the first form, a manufacturing method of the optical information recording medium according to the present invention comprising:

disposing the cushion layer at least in a part between the optical information layer and the reversible thermosensitive layer, laminating the optical information layer and the reversible thermosensitive layer in such a manner that the optical information recording medium has a weight imbalance of 2.5 g·mm or less, and optionally other steps. According to this manufacturing method, the heating unit and the surface of the optical information recording medium are uniformly contacted each other and to every region of the optical information recording medium, the heat is uniformly transmitted, so that the uniformity of the image is improved.

In this case, the weight imbalance of the optical information recording medium set by laminating the optical information layer to the reversible thermosensitive layer, is preferably 0 g·mm to 1.5 g·mm.

Here, the value of the weight imbalance is obtained by multiplying the mass (g) of the optical information recording medium by the distance (mm) between the geometric center and the mass center of the optical information recording medium. When the weight imbalance is more than 2.5 g·mm, during a high speed-reproducing, the swing of the recording medium becomes large, so that a disadvantage is likely to be caused wherein the reproducing cannot be performed.

The manufacturing method of the optical information recording medium according to the present invention is, in the second form, a manufacturing method for producing the optical information recording medium according to the present invention comprising:

disposing the reversible thermosensitive layer in such a manner that the reversible thermosensitive layer has a thickness distribution having a form corresponding to the form of the warpage of the optical information layer from the inner circle part of the optical information recording medium to the outer circle part of the optical information recording medium, wherin the optical information layer has a warpage angle of within ±0.7° and a warpage degree of 0.3 mm or less, laminating the optical information layer and the reversible thermosensitive layer, and optinally other steps. According to this manufacturing method, the heating unit and the surface of the optical information recording medium are uniformly contacted with each other and to every region of the optical information recording medium, the heat is uniformly transmitted, so that the uniformity of the image is improved.

In this case, when the optical information layer of the optical information recording medium has an upward warpage, it is preferred that the reversible thermosensitive layer has a concave thickness distribution from the inner circle part to outer circle part of the optical information recording medium. On the other hand, when the optical information layer of the optical information recording medium has a downward warpage, it is preferred that the reversible thermosensitive layer has a convex thickness distribution from the inner circle part to outer circle part of the optical information recording medium.

Figure 7:
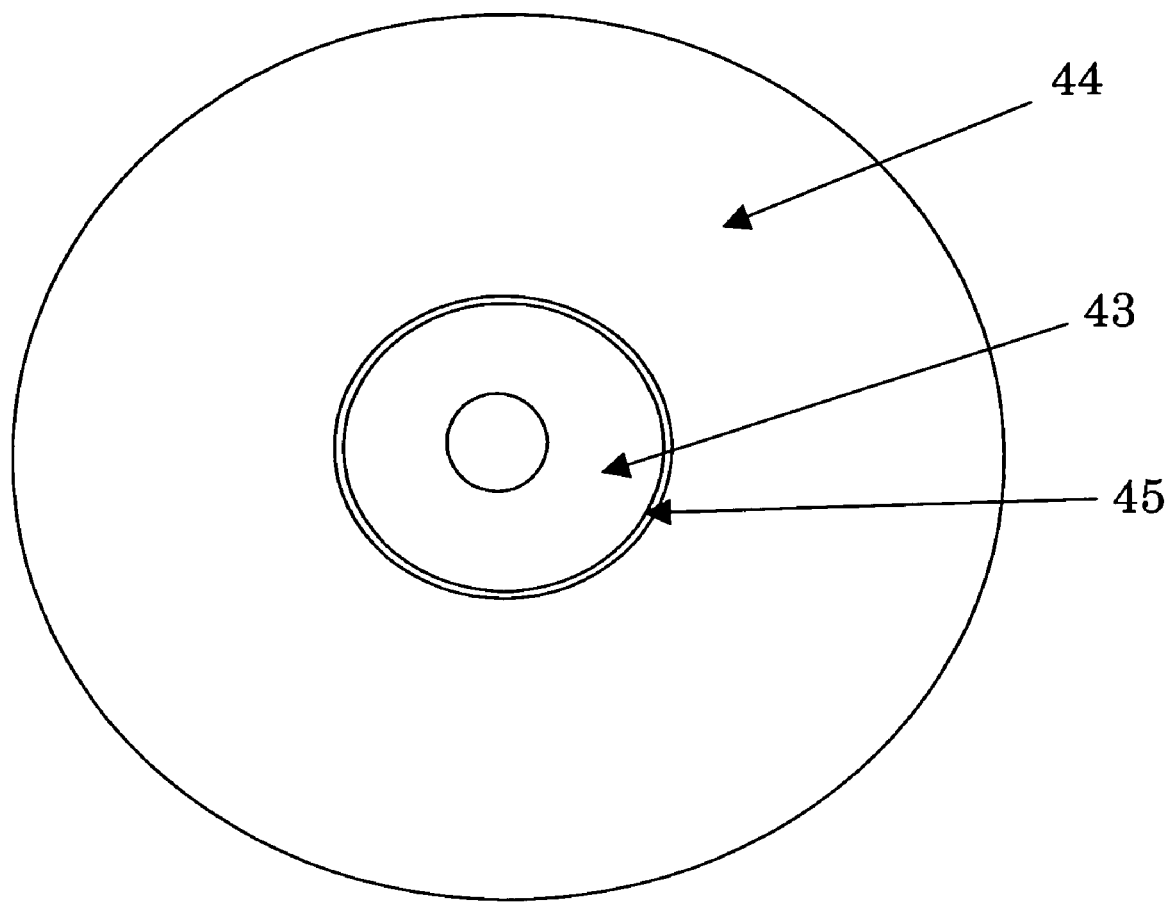
FIG. 7 is a plan view schematically showing an example of the optical information recording medium having the reversible display function according to the present invention.

As shown in FIG. 7, the optical information recording medium according to the present invention has a thickness of preferably 1.14 mm to 1.50 mm in an infromation area (44) (in the outside of the stack rib (45)) and a thickness of preferably 1.14 mm to 1.40 mm in the clamping area (43) (in the inside of the stack rib (45)). Since a CD disc, a CD-R disc, a CD-RW disc and a DVD disc which are widely distributed in the world, have a thickness of 1.2 mm, the optical information recroding medium having the above-noted thickness can utilize the infrastructure of the world.

The optical information recording medium according to the present invention has a warpage angle of preferably within ±0.7°, more preferably within ±0.55°, and an amount of warpage of preferably 0.3 mm or less, more preferably 0.15 mm or less.

Here, the warpage angle is defined as the maximum angle among the angles formed between the standard surface which is a disc surface of a clamped completely plane optical information recording medium and all of the tangent lines which are drawn with respect to all of the surfaces of the optical information recording medium which are to be measured. The warpage degree is defined as a distance between the above-noted standard surface and a point in the optical information recording medium which is distant from the standard surface with the maximum distance among all points in the optical information recording medium. When the warpage angle and warpage degree are more than the avobe-noted range of the standard, the light irradiated into the optical information recording medium and reflected by the optical information recording medium cannot return to the pickup, so that a disadvantage is caused wherein the recorded information cannot be read out and during the recording, the beam spot is deformed and a pit in an advantageous form cannot be formed, so that a disadvantage is caused wherein the recorded information cannot be read.

The optical information recording medium according to the present invention comprises the substrate in the form of a disc which has preferably a diameter of 80 mm to 120 mm, and has a weight imbalance of 2.5 g·mm or less, as described above.

(Image Processing Method)

The image processing method according to the present invention comprises at least one of forming the image in the reversible thermosensitive layer of the optical information recording medium according to the present invention by heating the reversible thermosensitive layer using an image processing unit, erasing the image in the reversible thermosensitive layer of the optical information recording medium according to the present invention by heating the reversible thermosensitive layer using an image processing unit, and optinally other steps selected properly depending on the necessity, such as conveying and controlling.

The image processing unit is not restricted and may be properly selected depending on the application. Examples of the image processing unit include a thermal head and a laser irradiating apparatus. Examples of the imge erasing unit include a thermal head, a ceramic heater, a heat roller, a hot stamp, a heat block and a laser irradiating apparatus. These units can be used individually or in combination.

The preset temperature of the thermal head is not restricted and may be properly selected depending on the application. The preset temperature is preferably 110° C. or more, more preferably 112° C. or more, most preferably 115° C. or more.

By using the thermal head, the size of the image processing apparatus can be minimized and the power consumed for the apparatus can be reduced, so that a handy-type apparatus driven by a battery can be produced. When the image recording and erasing are performed by one thermal head, the size of the apparatus can be further minimized. When the image recording and erasing are performed by one thermal head, such two manners can be adopted as one manner in which after all of the recorded imges are erased, a new image is recorded and another manner which is the overwrite system and in which by changing the energy, while erasing the recorde imge, simalteneously recording a new image. The overwrite system contribute to increasing the recording speed, since the total time for the image recording and erasing is lessened.

Figure 15:
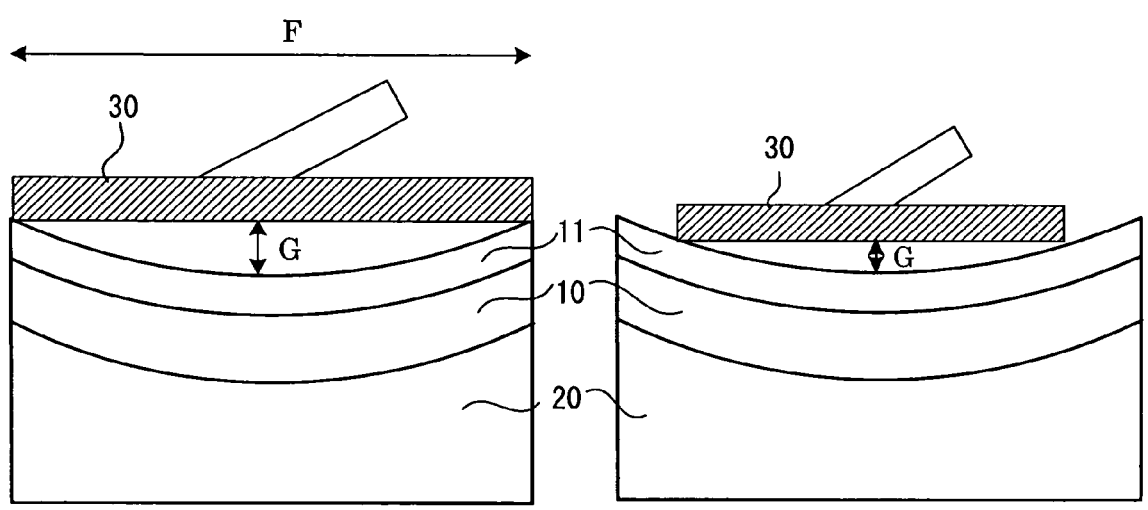
FIG. 15 is a section view schematically showing the relationship between the size of the thermal head and the maximum distance between the optical information recording medium and the thermal head which is contacted with the optical information recording medium.

As shown in FIG. 15, in the case where the thermal head is contacted with two optical information recording media having the same warpage form as each other, when the size of the thermal head F (mm) is small, the maximum distance G (µm) between the thermal head and the optical information recording medium which are contacted with each other, becomes small and F (mm) and G (µm) satisfy preferably the numerical formula: $0.58 \leq F/G$, and more preferably the numerical formula: $0.75 \leq F/G$. The thermal head has a size of preferably 10 mm to 60 mm. By the above-noted relationship between the size of the thermal head F (mm) and the maximum distance G (µm), the printing quality of the optical information recording medium can be maintained.

The conveying is not restricted so long as the conveying has the function of conveying the optical information recording medium one by one and may be properly selected depending on the application. Examples of the conveying include a conveying belt, a conveying roller and a combination of the conveying belt and the conveying roller.

The controlling is not restricted so long as the controlling has the function of controlling the above-noted steps. Examples of the controlling include a controlling by a sequencer and a controlling by a computer.

Above, with respect to the optical information recording medium according to the present invention and the image processing method using the above-noted optical information recording medium, explanations are given in detail; however, the above-noted forms of the embodiment of the present invention should not be construed as limiting the scope of the present invention and the forms may be variously changed so long as the forms deviate from the outline of the present invention.

Hereinbelow, with respect to the present inmvention, explanations are given with referring to Examples which should not be construed as limiting the scope of the present invention.

EXAMPLE 1

-Production of Optical Information Recording Medium-

The substrate in the form of a disc having a guide groove of a concave-covex pattern which has a depth of 1,700 angstrom, a width of 0.21 µm and a track pitch of 0.74 µm and wich is formed on the surface of the substarte which is made of a polycarbonate resin and which has a diameter of 120 mm and a thickness of 0.6 mm, was prepared. On the substrate, the recording layer comprising an organic dye was disposed by coating the substrate with a coating liquid for producing the recording layer, which is prepared by dissolving a squarylium dye compound in 2,2,3,3-tetrafluoropropanol according to a spinning coating in such a manner that the recording layer has a thickness of 800 angstroms. On the recording layer comprising an organic dye, the reflective layer comprising Ag was disposed according to a sputtering in which argon is used as a sputtering gas in such a manner that the reflective layer has a thickness of 1400 angstroms. On the reflective alyer, the protective layer comprising an ultraviolet-curing resin was disposed in such a manner that the protective layer has a thickness of 4 µm. To these layers (a composition part of the recording medium), the cover substrate was laminated through an ultraviolet-curing adhesive (manufactured and sold by Nippon Kayaku Co., Ltd.; trade name: KAYARAD DVD 003), thereby preparing a composition part of the recording medium comprising eight layers represented by 1 to 8 in FIG. 1 (optical recording member).

Next, on the bare surface of a polyethyleneterephthalate (PET) film of a magnetic sheet (manufactured and sold by Dainippon Ink & Chemicals, Inc.; trade name: Memory DIC DS-1711-1040, in which a magnetic recording layer and a self cleaning layer are disposed on a transparent PET film having a thickness of 188 µm by a coating), the reflective layer having a thickness of 400 angstroms was disposed by metallizing aluminum. On the reflective layer, the tacky layer having a thickness of 0.5 µm was disposed by coating the surface of the reflective layer with a coating liquid comprising 10 parts by mass of a vinyl chloride-vinyl acetate-phosphorate ester copolymer (manufactured and sold by Denki Kagaku Kogyo Kabushiki Kaisha; trade name: DENKA VINYL #1000P), 45 parts by mass of methyl ethyl ketone and 45 parts by mass of toluene, and heating-drying the resultant coating, thereby preparing a composition part of the recording medium.

Next, on the tacky layer of the above-prepared composition part of the recording medium, the reversible thermosensitive layer was disposed according to a method comprising preparing a coating liquid for producing the reversible thermosensitive layer which comprises 40 parts by mass of a polyurethane resin (trial-manufactured by Negami Chemical Industrial Co., Ltd.; product name: UR 17, having a solid content of 30% by mass) represented by the following structural formula A, 40 parts by mass of a polyurethane resin (trial-manufactured by Negami Chemical Industrial Co., Ltd.; product name: UR 10, having a solid content of 30% by mass) represented by the following structural formula B, 4 parts by mass of stearyl stearate (a sigma reagent manufactured and sold by Sigma-Aldrich Co., having a purity of 99%), 4 parts by weight of eicosane diacid (manufactured and sold by OKAMURA OIL MILL, LTD.; trade name: SL-20-

99), 1 part by mass of a photopolymerization initiator (manufactured and sold by Ciba Geigy Ltd.; trade name: IRGACURE 184) and 112 parts by mass of tetrahydrofuran; coating the above-noted tacky layer with the above-prepared coating liquid; heating-drying the resultant coating; and curing the coating by irradiating an ultraviolet light using a high-pressurized mercury light having a power of 80 W/cm. On the reversible thermosensitive layer, the overcoat layer having a thickness of 3 μm was disposed according to a method comprising preparing a coating liquid for producing the overcoat layer which comprises 10 parts by mass of a 75% by mass butyl acetate solution of an urethane-acrylate ultraviolet-curing resin (manufactured and sold by Dainippon Ink and Chemicals, Inc.; trade name: UNIDIC C7-175) and 10 parts by mass of isopropyl alcohol; coating the reversible thermosensitive layer with the above-prepared coating liquid; heating-drying the resultant coating; and curing the coating by irradiating an ultraviolet light using a high-pressurized mercury light having a power of 80 W/cm, thereby preparing the reversible thermosensitive layer represented by 11 in FIG. 1.

(the self-cleaning layer was present originally in the above-noted magnetic sheet), the cushion layer comprising a polyvinyl chloride resin and the adhesive layer comprising an acrylic resin were disposed in such a manner that the combined thickness of the cushion layer (having a thickness of 30 μm) and the adhesive layer is 55 μm, thereby preparing a composition part of the recording medium (a reversible thermosensitive recording label) comprising the layers represented by 9, 10 and 11 in FIG. 1. The reversible thermosensitive recording label was cut into the form of a doughnut as shown in FIG. 7 and the cushion layer and the adhesive layer were formed as the layers having a form shown in FIG. 4.

Figure 8:
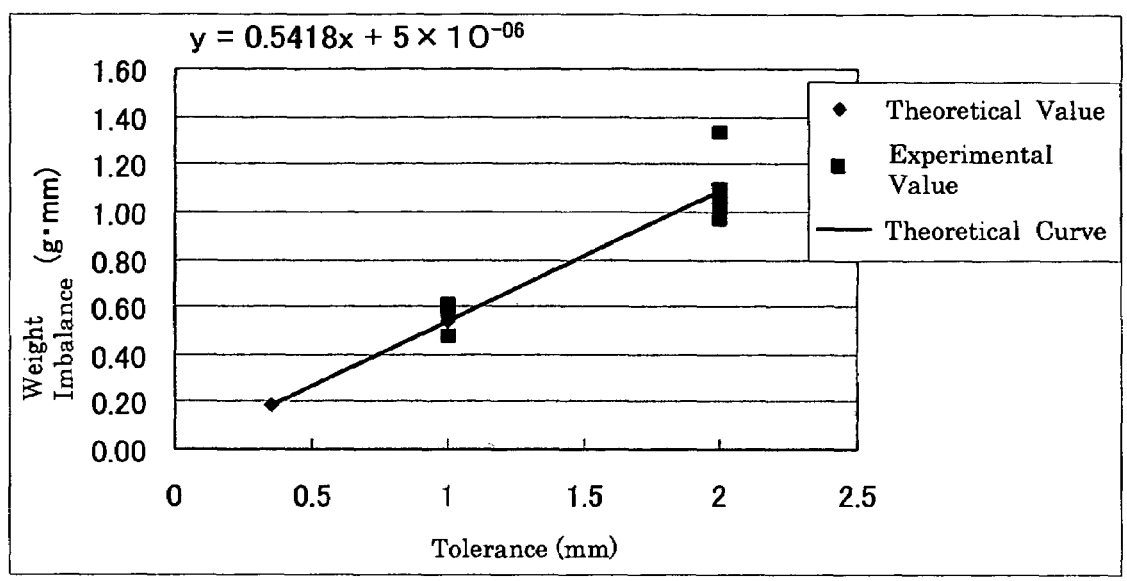
FIG. 8 is a graph showing a relationship between the tolerance and the weight imbalance.

By laminating the reversible thermosensitive recording label to the above-prepared optical recording member using a fixing tool, the optical information recording medium having the reversible display function according to the present invention was produced. In this laminating, by shifting the tolerance between the fixing tool and the reversible thermosensitive recording label, the weight imbalance was properly varied. The relationship between the tolerance and the weght imbalance is shown in FIG. 8. In Example 1, the laminating Structural Formula A

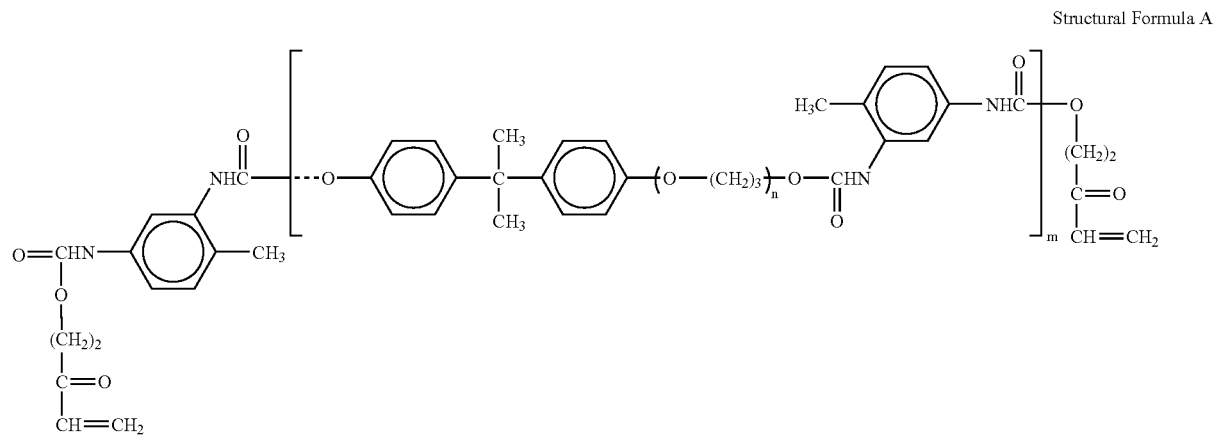

wherein m and n represent respectively the number of reccuring unit.

was performed in such a manner that the optical information recording medium has a weight imbalance of 2.0 g·mm.

Structural Formula B

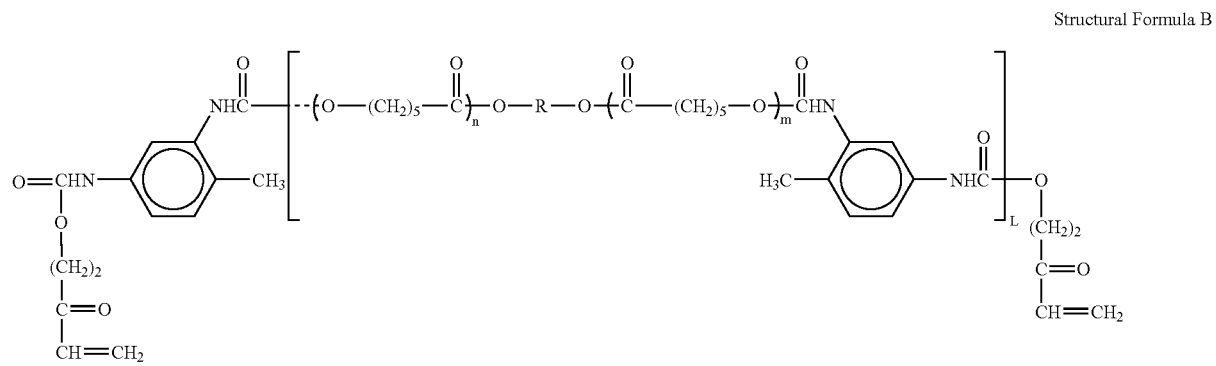

wherein m, n and L represent respectively the number of recurring unit.

Next, on the self-cleaning layer of the above-prepared reversible thermosensitive layer represented by 11 in FIG. 1

EXAMPLE 2

The substrate in the form of a disc having a guide groove of a concave-covex pattern which has a depth of 270 angstrom and a track pitch of 0.74 μm and wich is formed on the surface of the substarte which is made of a polycarbonate resin and which has a diameter of 120 mm and a thickness of 0.6 mm, was prepared. On the substrate, the first protective layer comprising ZnS—SiO$_2$ was disposed according to a sputtering in which argon is used as a sputtering gas in such a manner that the first protective layer has a thickness of 700 angstroms. On the first protective layer, the phase-changing recording layer having a composition ratio (in atomic %) of Ag:In:Sb:Te:Ge=0.2:3.5:71.4:21.4:3.5 was disposed according to a sputtering in which argon is used as a sputtering gas in such a manner that the phase-changing recording layer has a thickness of 110 angstroms. On the phase-changing recording layer, the second protective layer comprising ZnS—SiO$_2$ was disposed according to a sputtering in which argon is used as a sputtering gas in such a manner that the second protective layer has a thickness of 110 angstroms. On the second protective layer, the reflective layer comprising Ag was dsiposed according to a sputtering in which argon is used as a sputtering gas in such a manner that the reflective layer has a thickness of 1400 angstroms.

Next, on the reflective layer, the third protective layer comprising an ultraviolet-curing resin and having a thickness of 4 μm was disposed and to the third protective layer, the cover substrate was laminated through an ultraviolet-curing adhesive (manufactured and sold by Nippon Kayaku Co., Ltd.; trade name: KAYARAD DVD 003), thereby preparing a composition part of the recording medium comprising eight layers represented by 1 to 8 shown in FIG. 2 (optical recording member).

Next, by preparing a reversible thermosensitive recording label and laminating the reversible thermosensitive recording label (in which the cushion layer has a thickness of 30 μm) to the optical recording member in substancially the same manner as in Example 1, except that the reversible thermosensitive recording label was laminated to the optical recording member in such a manner that the optical information recording medium has a weight imbalance of 1.5 g·mm, the optical information recording medium having the reversible display function was produced.

EXAMPLE 3

The reversible thermosensitive recording label was prepared in substantially the same manner as in Example 1, except that the reversible thermosensitive recording layer was produced in such a manner that the reversible thermosensitive layer has a concave thickness distribution as shown in FIG. 6 and a difference between the maximum thickness (32 μm) and the minimum thickness (22 μm) is 10 μm in the thickness distribution (since the optical recording member had an upward warpage (warpage angle of 0.55° and warpage degree of 152 μm) in Example 1). Next, the optical information recording medium having the reversible display function was produced in substantially the same manner as in Example 1, except that the optical recording member and the reversible thermosensitive recording label were laminated to each other using a fixing tool in such a manner that the optical information recording medium has a weight imbalance of 2.2 g·mm.

EXAMPLE 4

The optical information recording medium having the reversible display function was produced in substantially the same manner as in Example 1, except that the optical recording member and the reversible thermosensitive recording label were laminated to each other using a fixing tool in such a manner that the optical information recording medium has a weight imbalance of 3.5 g·mm.

EXAMPLE 5

The optical information recording medium having the reversible display function was produced in substantially the same manner as in Example 2, except that the optical recording member and the reversible thermosensitive recording label were laminated to each other using a fixing tool in such a manner that the optical information recording medium has a weight imbalance of 5.0 g·mm.

EXAMPLE 6

The optical information recording medium having the reversible display function was produced in substantially the same manner as in Example 3, except that the optical recording member had an upward warpage (warpage degree of 1.01° and warpage degree of 406 μm).

COMPARATIVE EXAMPLE 1

The optical information recording medium having the reversible display function was produced in substantially the same manner as in Example 1, except that in the preparing of the reversible thermosensitive recording label, the cushion layer was not disposed and only the adhesive layer comprising an acrylic resin was disposed.

EXAMPLE 7

The optical information recording medium having the reversible display function was produced in substantially the same manner as in Example 3, except that in the preparing of the reversible thermosensitive recoeding label, the reversible thermosensitive layer in the reversible thermosensitive recording layer had no thickness distribution.

<Recording and Reproducing Evaluation>

In the recording layer of each of the above-produced optical information recording media having the reversible display function, the DVD (8-16) signal was recorded and reproduced using a DVD+R/RW drive (manufactured and sold by Ricoh Company, Ltd; trade name: MP 5240A) under the condition wherein the number of aperture (NA) was 0.65 and a linear velocity of 3.49 m/s and the optical information recording media were evaluated with respect to the recording and reproducing. The result of the evaluation is shown in Table 1.

<Image Uniformity Evaluation>

A part of the recorded information (e.g., a date and a time) was display-recorded and visualized in the reversible thermosensitive layer of each of the produced optical information recording media having the reversible display function using a recording apparatus equipped with a recording unit (thermal head) and an erasing unit (ceramic heater) by adjusting the recording energy of the thermal head to the change in the recording temperature of each optical information recording medium. The uniformity of the thus formed image was visually observed and evaluated according to the following criteria. The result of the evaluation is shown in Table 1.

[Criteria]
A: the uniformity was advantageous.
B: the uniformity was a little poor.
C: the uniformity was poor.

TABLE 1

|  | Weight Imbalance (g · mm) | Warpage Angle (°) | Warpage Degree (μm) | Jitter | PIE* | POF* | Image Uniformity |
|---|---|---|---|---|---|---|---|
| Example 1 | 2.0 | 0.38 | 52 | 8.68 | 8 | 0 | A |
| Example 2 | 1.5 | 0.46 | 81 | 8.54 | 10 | 0 | A |
| Example 3 | 2.2 | 0.55 | 62 | 8.88 | 12 | 0 | A |
| Example 4 | 3.5 | 0.49 | 102 | 9.82 | 39 | 0 | A |
| Example 5 | 5.0 | 0.59 | 210 | 10.60 | 79 | 0 | A |
| Example 6 | 2.1 | 1.01 | 406 | 9.30 | 40 | 0 | B |
| Example 7 | 2.2 | 0.55 | 62 | 8.67 | 10 | 0 | B |
| Comp. Ex. 1 | 2.0 | 0.38 | 52 | 8.54 | 9 | 0 | B | wherein "PIE*" means "Parity Inner Error" and "POF*" means "Parity Outer Failure".

According to the physical format standard for a DVD-Video/ROM with respect to the recording/reproducing signal, PIE is 280 or less, POF is 0 or less and a jitter is 9% or less. As the result of the evaluation shown in Table 1, the optical information recording media produced in Examples 1 to 3 satisfy the above-noted standard and secure the physical compatibility with the reproducing DVD.

EXAMPLE 8

The substrate in the form of a disc having a guide groove of a concave-covex pattern which has a depth of 1,700 angstrom, a width of 0.21 μm and a track pitch of 0.74 μm and wich is formed on the surface of the substarte which is made of a polycarbonate resin and which has a diameter of 120 mm and a thickness of 0.6 mm, was prepared. On the substrate, the recording layer comprising an organic dye was disposed by coating the substrate with a coating liquid for producing the recording layer, which is prepared by dissolving a squarylium dye compound in 2,2,3,3-tetrafluoropropanol according to a spinning coating in such a manner that the recording layer has a thickness of 800 angstroms. On the recording layer comprising an organic dye, the reflective layer comprising Ag was disposed according to a sputtering in which argon is used as a sputtering gas in such a manner that the reflective layer has a thickness of 1400 angstroms. On the reflective layer, the protective layer comprising an ultraviolet-curing resin was disposed in such a manner that the protective layer has a thickness of 4 μm. To these layers (a composition part of the recording medium), the cover substrate was laminated through an ultraviolet-curing adhesive (manufactured and sold by Nippon Kayaku Co., Ltd.; trade name: KAYARAD DVD 003), thereby preparing a composition part of the recording medium corresponding to the layers part represented by 20 in FIG. 1 (optical information layer).

Next, the reversible thermosensitive recording label comprising the reversible thermosensitive layer changing the state thereof between a transparent state and an opaque state by the heating the reversible thermosensitive layer was prepared as follows. First, on the support comprising a transparent polyaramide film (manufactured and sold by Teijin, Inc.; trade name: Aramica 50 R, having a thickness of 50 μm), the reflective layer having a thickness of 600 angstroms was disposed by metallizing aluminum. On the reflective layer, the tacky layer having a thickness of 1 μm was disposed by coating the surface of the reflective layer with a coating liquid comprising a vinyl chloride-vinyl acetate-phosphorate ester copolymer (manufactured and sold by Denki Kagaku Kogyo Kabushiki Kaisha; trade name: DENKA VINYL #1000P) dissolved in a solvent mixture of methyl ethyl ketone and toluene (in a mixing ratio of 1:1), and heating-drying the resultant coating, thereby preparing a composition part of the recording medium.

A layer having a thickness of 10 μm was disposed on the tacky layer of the above-prepared composition part of the recording medium by coating the surface of the tacky layer with a coating liquid for producing the reversible thermosensitive recording layer which comprises 9 parts by mass of behenic acid (manufactured and sold by Sigma-Aldrich Co., a reagent having a purity of 99%), 0.5 part by mass of 1,4-cis-cyclohexyl dicarboxylic acid (manufactured and sold by Tokyo Chemical Industry Co., Ltd., a reagent), 0.5 part by mass of 1,4-trans-cyclohexyldicarboxylic acid (manufactured and sold by Tokyo Chemical Industry Co., Ltd., a reagent), 27 parts by mass of a vinyl chloride-vinyl acetate-vinyl alcohol copolymer (manufactured and sold by Dow Chemical Company; trade name: VAGH), 3 parts by mass of an isocyanate compound (manufactured and sold by Nippon Polyurethane Industry Co., Ltd.; trade name: Collonate HL), 250 parts by mass of tetrahydrofuran (THF) and 20 parts by mass of toluene, and by heating-drying the resultant coating; and the disposed layer was subjected to an atmosphere having a temperature of 60° C. for 24 hours for curing the resin in the disposed layer, thereby disposing the reversible thermosensitive recording layer.

Next, on the above-disposed reversible thermosensitive recording layer, the protective layer having a thickness of 3 μm was disposed by coating the reversible thermosensitive recording layer using a wire bar with a coating liquid for producing the protective layer which comprises 10 parts by mass of a 75% by mass butyl acetate solution of an urethane-acrylate ultraviolet-curing resin (manufactured and sold by Dainippon Ink and Chemicals, Inc.; trade name: UNIDIC C7-175), 1 part by mass of calcium carbide (manufactured sold by Shiraishi Kogyo Kaisha, Ltd.; trade name: Brilliant 15) and 10 parts by mass of toluene, and by curing the resultant coating by irradiating an ultraviolet light using a high-pressurized mercury light having a power of 80 W/cm, thereby preparing the reversible thermosensitive layer represented by 11 in FIG. 1.

Next, on the surface of the support of the reversible thermosensitive layer on which no layer was disposed, the cushion layer having a thickness of 40 μm was disposed by coating the support of the reversible thermosensitive layer with a coating liquid comprising an urethane resin for producing the cushion layer. On the surface of the cushion layer, the adhesive layer having a thickness of 29 μm was disposed by coating the cushion layer with a coating liquid comprising an acrylic resin for producing the adhesive layer.

Last, by laminating the above-noted optical information layer and the reversible thermosensitive layer to each other using a fixing tool, the optical information recording medium having the reversible display function according to the present invention was produced.

The printing was performed in the reversible thermosensitive layer of the obtained optical information recording medium by applying a pressure (about 1.8 N) virtically to the reversible thermosensitive layer for two to three seconds using a thermal head (manufactured and sold by Kyocera Corporation, having a printing width of 35 mm×60 mm and a resolution of 305 dpi) and at this time, the maximum distance G between the reversible thermosensitive layer and the thermal head was measured and found to be 25 μm. Also the deformation degree in the vertical direction B of the cushion layer was measured and found to be 32 μm. Further, the restoration degree in the vertical direction C of the cushion layer when the printing in the optical information recording medium was finished (when the pressure in the vertical direction was removed), was measured and found to be 19 μm.

EXAMPLE 9

The optical information recording medium was produced in substantially the same manner as in Example 8, except that the cushion layer comprising an urethane resin and having a thickness of 40 μm was disposed.

In the reversible thermosensitive layer of the obtained optical information recording medium, the printing was performed (a pressure in the vertical direction was applied) using a thermal head having a length of 35 mm under the same condition as in Example 8. The maximum distance G between the reversible thermosensitive layer and the thermal head was measured and found to be 30 μm. Also the deformation degree in the vertical direction B of the cushion layer was measured and found to be 32 μm. Further, the restoration degree in the vertical direction C of the cushion layer when the printing in the optical information recording medium was finished (when the pressure in the vertical direction was removed), was measured and found to be 19 μm.

EXAMPLE 10

The optical information recording medium was produced in substantially the same manner as in Example 8, except that the cushion layer comprising an urethane resin and having a thickness of 60 μm was disposed.

In the reversible thermosensitive layer of the obtained optical information recording medium, the printing was performed (a pressure in the vertical direction was applied) using a thermal head having a length of 60 mm under the same condition as in Example 8. The maximum distance G between the reversible thermosensitive layer and the thermal head was measured and found to be 40 μm. Also the deformation degree in the vertical direction B of the cushion layer was measured and found to be 48 μm. Further, the restoration degree in the vertical direction C of the cushion layer when the printing in the optical information recording medium was finished (when the pressure in the vertical direction was removed), was measured and found to be 29 μm.

EXAMPLE 11

The optical information recording medium was produced in substantially the same manner as in Example 8, except that the maximum distance G between the reversible thermosensitive layer and the thermal head was adjusted to 70 μm.

In the reversible thermosensitive layer of the obtained optical information recording medium, the printing was performed (a pressure in the vertical direction was applied) using a thermal head having a length of 35 mm under the same condition as in Example 8. The deformation degree in the vertical direction B of the cushion layer was measured and found to be 32 μm. Also, the restoration degree in the vertical direction C of the cushion layer when the printing in the optical information recording medium was finished (when the pressure in the vertical direction was removed), was measured and found to be 19 μm.

COMPARATIVE EXAMPLE 2

The optical information recording medium was produced in substantially the same manner as in Example 9, except that the cushion layer comprising an urethane resin and having a thickness of 10 μm was disposed.

In the reversible thermosensitive layer of the obtained optical information recording medium, the printing was performed (a pressure in the vertical direction was applied) using a thermal head having a length of 35 mm under the same condition as in Example 8. The maximum distance G between the reversible thermosensitive layer and the thermal head was measured and found to be 30 μm. Also the deformation degree in the vertical direction B of the cushion layer was measured and found to be 8 μm. Further, the restoration degree in the vertical direction C of the cushion layer when the printing in the optical information recording medium was finished (when the pressure in the vertical direction was removed), was measured and found to be 5 μm.

COMPARATIVE EXAMPLE 3

The optical information recording medium was produced in substantially the same manner as in Example 8, except that the cushion layer was not disposed.

In the reversible thermosensitive layer of the obtained optical information recording medium, the printing was performed (a pressure in the vertical direction was applied) using a thermal head having a length of 35 mm under the same condition as in Example 8. The maximum distance G between the reversible thermosensitive layer and the thermal head was measured and found to be 25 μm. Also the deformation degree in the vertical direction B of the cushion layer was measured and found to be 5 μm. Further, the restoration degree in the vertical direction C of the cushion layer when the printing in the optical information recording medium was finished (when the pressure in the vertical direction was removed), was measured and found to be 3 μm.

<Image Uniformity Evaluation>

A part of the information (e.g., a date and a time) recorded using a DVD+R/RW drive (manufactured and sold by Ricoh Company, Ltd; trade name: MP 5240A) in the recording layer of each of the obtained reversible thermosensitive recording medium was display-recorded and visualized in the reversible thermosensitive layer of each of the produced optical information recording media having the reversible display function using a recording apparatus equipped with a recording unit (thermal head) and an erasing unit (ceramic heater) by adjusting the recording energy of the thermal head to the change in the recording temperature of each optical information recording medium. The uniformity of the thus formed image was visually observed and evaluated according to the following criteria.

The result of the evaluation is shown in Table 1.
[Criteria]
A: the uniformity was advantageous.
B: the uniformity was a little poor.
C: the uniformity was poor.

TABLE 2

|  | Thickness of Cushion Layer A (μm) | Maximum Distance G (μm) | Size of Thermal Head F (mm) | F/G | Vertical Deformation B (μm) | Vertical Restoration C (μm) | Image Uniformity |
| --- | --- | --- | --- | --- | --- | --- | --- |
| Example 8 | 40 | 25 | 35 | 1.4 | 32 | 19 | A |
| Example 9 | 40 | 30 | 35 | 1.167 | 32 | 19 | A |
| Example 10 | 60 | 40 | 60 | 1.5 | 48 | 29 | A |
| Example 11 | 40 | 70 | 35 | 0.5 | 32 | 19 | B |
| Comp. Ex. 2 | 10 | 30 | 35 | 1.167 | 8 | 5 | C |
| Comp. Ex. 3 | 0 | 25 | 35 | 1.4 | 5 | 3 | C |

As the result of the evaluation shown in Table 2, in Examples 8 to 11, it could be confirmed that an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium; and an image processing method using the above-noted optical information recording medium can be provided.

Since the optical information recording medium according to the present invention is an optical information recording medium by which the getting thereof in and out of a reproducing apparatus and the reproducing of recoding data can be stably and reliably performed and the recording content can be visually confirmed, and which has the reversible display function of performing at least one of the recording, erasing and rewriting of the display which is excellent in the uniformity of the image, easily, with a good appearance and without damaging the optical information recording medium, the optical information recording medium according to the present invention can be preferably applied to various optical information recording media, such as CD-R, CD-RW and DVD.

What is claimed is:

1. An optical information recording medium comprising:
a substrate,
an optical information layer,
a cushion layer, and
a reversible thermosensitive layer, in this order,
wherein the cushion layer is disposed in at least a part of a space between the optical information layer and the reversible thermosensitive layer in such a manner that the cushion layer has a thickness of 20 μm to 80 μm and in the reversible thermosensitive layer, at least a part of the information recorded in the optical information layer can be recorded in such a manner that the part of the information can be visually recognized.

2. The optical information recording medium according to claim 1,
wherein the optical information recording medium comprises the cushion layer and an adhesive layer between the optical information layer and the reversible thermosensitive layer in at least one of the inner circle part, the middle circle part and the outer circle part of the optical information recording medium.

3. The optical information recording medium according to claim 1,
wherein the optical information recording medium comprises a cavity instead of the cushion layer and the adhesive layer between the optical information layer and the reversible thermosensitive layer.

4. The optical information recording medium according to claim 1,
wherein the optical information recording medium comprises a gap part in which the cushion layer and the adhesive layer are not disposed, in at least one of the inner circle part, the middle circle part and the outer circle part of the optical information recording medium.

5. The optical information recording medium according to claim 4,
wherein the cavity and the gap part are communicative connected and the gap part is opened to the outer side of the optical information recording medium.

6. The optical information recording medium according to claim 1,
wherein the optical information recording medium comprises the cushion layer having a thickness of A (μm) between the optical information layer and the reversible thermosensitive layer and the deformation degree B (μm) of the cushion layer in the vertical direction caused by at least one of the image forming and the image erasing performed using an image processing unit in the optical information recording medium satisfies the numerical formula: $0.3 \leq B/A \leq 0.8$.

7. The optical information recording medium according to claim 6,
wherein the deformation degree B (μm) in the vertical direction of the cushion layer is 5 μm to 60 μm.

8. The optical information recording medium according to claim 6,
wherein the image processing unit is a thermal head.

9. The optical information recording medium according to claim 8,
wherein at least one of the image forming and the image erasing is performed by contacting the thermal head in the vertical direction with the reversible thermosensitive layer.

10. The optical information recording medium according to claim 1,
wherein the deformation degree B (μm) of the cushion layer in the vertical direction caused by at least one of the image forming and the image erasing performed using an image processing unit in the optical information recording medium and the restoration degree C (μm) of the cushion layer in the vertical direction caused by the removing of the image processing unit from the optical information recording medium after at least one of the image forming and the image erasing was performed, satisfy the numerical formula: $0.5 \leq C/B \leq 1$.

11. The optical information recording medium according to claim 1,
wherein the thickness D (μm) of the reversible thermosensitive layer and the thickness A (μm) of the cushion layer satisfy the numerical formula: $60\ \mu m \leq A+D \leq 200\ \mu m$.

12. The optical information recording medium according to claim 1,
wherein the reversible thermosensitive layer has a thickness D (μm) of 25 μm to 150 μm.

13. The optical information recording medium according to claim 1,
wherein the cushion layer comprises at least one of a cushioning material and an elastic material.

14. The optical information recording medium according to claim 1,
wherein the reversible thermosensitive layer has a thickness distribution having a form corresponding to the form of the warpage of the optical information layer from the inner circle part of the optical information recording medium to the outer circle part of the optical information recording medium.

15. The optical information recording medium according to claim 14,
wherein when the optical information layer has an upward warpage, the reversible thermosensitive layer has a thickness distribution having a concave form from the inner circle part of the optical information recording medium to the outer circle part of the optical information recording medium.

16. The optical information recording medium according to claim 14,
wherein when the optical information layer has a downward warpage, the reversible thermosensitive layer has a thickness distribution having a convex form from the inner circle part of the optical information recording medium to the outer circle part of the optical information recording medium.

17. The optical information recording medium according to claim 1,
wherein the optical information layer comprises a recording layer comprising an organic dye.

18. The optical information recording medium according to claim 1,
wherein the optical information layer comprises a first protective layer, a phase-changing recording layer and a second protective layer which are laminated in this order.

19. The optical information recording medium according to claim 1,
wherein the optical information recording medium has a weight imbalance of 2.5 g·mm or less.

20. The optical information recording medium according to claim 1,
wherein the optical information recording medium has a thickness of 1.14 mm to 1.50 mm in the information area.

21. The optical information recording medium according to claim 1,
wherein the optical information recording medium has a thickness of 1.14 mm to 1.40 mm in the clamping area.

22. The optical information recording medium according to claim 1,
wherein the optical information recording medium has a warpage angle of within ±0.7° and a warpage degree of 0.3 mm or less, before and after the information recording in the reversible thermosensitive layer.

23. The optical information recording medium according to claim 1,
wherein the reversible thermosensitive layer changes reversibly the color tone thereof depending on the temperature.

24. The optical information recording medium according to claim 1,
wherein the reversible thermosensitive layer comprises a resin and an organic low-molecular weight compound and changes reversibly the transparency thereof depending on the temperature.

25. The optical information recording medium according to claim 1,
wherein the reversible thermosensitive layer comprises an electron-donating color-developing compound and an electron-accepting compound.

26. The optical information recording medium according to claim 1,
wherein the optical information recording medium has a diameter of 80 mm to 120 mm.

27. The optical information recording medium according to claim 1,
wherein the optical information recording medium comprises at least a support and a reversible thermosensitive recording layer configured to record at least a part of the information recorded in the optical information layer when the thermal head contacts the reversible thermosensitive layer.

28. A method for producing an optical information recording medium comprising:
disposing the cushion layer at least in a part between the optical information layer and the reversible thermosensitive layer, and
laminating the optical information layer and the reversible thermosensitive layer in such a manner that the optical information recording medium has a weight imbalance of 2.5 g·mm or less,
wherein the optical information recording medium comprises:
a substrate,
an optical information layer,
a cushion layer, and
a reversible thermosensitive layer, in this order,
wherein the cushion layer is disposed in at least a part of a space between the optical information layer and the reversible thermosensitive layer in such a manner that the cushion layer has a thickness of 20 μm to 80 μm and in the reversible thermosensitive layer, at least a part of the information recorded in the optical information layer can be recorded in such a manner that the part of the information can be visually recognized.

29. A manufacturing method of an optical information recording medium comprising:
disposing the reversible thermosensitive layer in such a manner that the reversible thermosensitive layer has a thickness distribution having a form corresponding to the form of the warpage of the optical information layer from the inner circle part of the optical information recording medium to the outer circle part of the optical information recording medium, wherein the optical information layer has a warpage angle of within ±0.7° and a warpage degree of 0.3 mm or less, and laminating the optical information layer and the reversible thermosensitive layer, wherein the optical information recording medium comprises:

a substrate, an optical information layer, a cushion layer, and a reversible thermosensitive layer, in this order, wherein the cushion layer is disposed in at least a part of a space between the optical information layer and the reversible thermosensitive layer in such a manner that the cushion layer has a thickness of 20 μm to 80 μm and in the reversible thermosensitive layer, at least a part of the information recorded in the optical information layer can be recorded in such a manner that the part of the information can be visually recognized.

30. An image processing method comprising:

forming an image in a reversible thermo sensitive layer of an optical information recording medium by heating the reversible thermosensitive layer, and erasing an image in a reversible thermosensitive layer of an optical information recording medium by heating the reversible thermosensitive layer, wherein the optical information recording medium comprises:

a substrate, an optical information layer, a cushion layer, and a reversible thermosensitive layer, in this order, wherein the cushion layer is disposed in at least a part of a space between the optical information layer and the reversible thermosensitive layer in such a manner that the cushion layer has a thickness of 20 μm to 80 μm and in the reversible thermosensitive layer, at least a part of the information recorded in the optical information layer can be recorded in such a manner that the part of the information can be visually recognized.

31. The image processing method according to claim 30, wherein the image is formed using at least one of a thermal head and a laser irradiating apparatus.

32. The image processing method according to claim 31, wherein the size of the thermal head F (mm) and the maximum distance G (μm) between the thermal head and the optical information recording medium which are contacted with each other by pressing the thermal head to the optical information recording medium, satisfy the numerical formula: $0.58 \leq F/G$.

33. The image processing method according to claim 32, wherein the thermal head has a size F of 10 mm to 60 mm.

34. The image processing method according to claim 31, wherein with erasing an image, a new image is formed simultaneously using the thermal head.

35. The image processing method according to claim 30, wherein the image is erased using at least one selected from the group consisting of a thermal head, a ceramic heater, a heat roller, a hot stamp, a heat block and a laser irradiating apparatus.

36. The image processing method according to claim 30, wherein when the optical information layer of the optical information recording medium has an upward or downward warpage causing the reversible thermosensitive layer to have a concave or convex form, heat applied to the reverse thermosensitive layer is uniformly transmitted throughout the optical information recording medium to form a uniform image.

* * * * *